(12) United States Patent
Usaki

(10) Patent No.: US 6,710,776 B2
(45) Date of Patent: Mar. 23, 2004

(54) POSITION FINDER, MEASURING APPARATUS WITH POSITION FINDER, AND MEASURING SYSTEM

(75) Inventor: Yoshihiko Usaki, Ono (JP)

(73) Assignee: TLV Company Limited, Hyogo-ken (JP)

(*) Notice: Subject to any disclaimer, the term of this patent is extended or adjusted under 35 U.S.C. 154(b) by 487 days.

(21) Appl. No.: 09/750,849

(22) Filed: Dec. 28, 2000

(65) Prior Publication Data
US 2001/0006384 A1 Jul. 5, 2001

(30) Foreign Application Priority Data
Dec. 28, 1999 (JP) .......................... 11-374438

(51) Int. Cl.⁷ .............................. G06T 13/00
(52) U.S. Cl. ............ 345/473; 345/179; 700/17; 700/83; 702/185; 376/259; 340/525
(58) Field of Search ................. 345/173, 179, 345/156, 204, 473, 635, 781; 376/259, 216; 700/17, 83; 340/525

(56) References Cited

U.S. PATENT DOCUMENTS 5,745,049 A * 4/1998 Akiyama et al. ...... 340/870.17
5,748,496 A    5/1998 Takahashi et al.
5,754,189 A * 5/1998 Doi et al. .................... 345/473
5,859,885 A * 1/1999 Rusnica et al. ............. 376/259
6,421,571 B1 * 7/2002 Spriggs et al. ................ 700/17

FOREIGN PATENT DOCUMENTS

| EP | 0 402 463 | 12/1990 |
| EP | 0 892 326 | 1/1999 |
| JP | 05 187 891 | 7/1993 |
| JP | 06 175 626 | 6/1994 |
| JP | 9 33298 | 2/1997 |
| JP | 11 88935 | 3/1999 |
| JP | 11 143525 | 5/1999 |
| JP | 11 231909 | 8/1999 |
| JP | 11 249729 | 9/1999 |
| WO | WO 98 10218 | 3/1998 |
| WO | WO 99 39129 | 8/1999 |

* cited by examiner

Primary Examiner—Amr Awad
(74) Attorney, Agent, or Firm—Kenyon & Kenyon

(57) ABSTRACT

A picture of a plan view of an area is displayed on a screen of a base unit of a measuring apparatus. The picture contains symbols for respective traps disposed in the displayed area. A bar code is assigned to each trap for identifying it. When the bar code on one trap is read out, a marking "X" is added to the symbol for that trap, so that an operator can readily know the location in the area of that trap on the display screen and, therefore, the current position of the operator in the area.

10 Claims, 18 Drawing Sheets

| Area | Trap No. | Trap Type | Model | Manufacture | Application | Pressure | Priority | Result | |
|---|---|---|---|---|---|---|---|---|---|
| 001 | 0001 | BUCKET | ABC | STU | Heating | 0-50 | Important | Good | -- |
| 001 | 0002 | THERMO | CDE | XYZ | Heating | 0-50 | Important | Good | -- |
| 001 | 0003 | TEMP.ADJ. | EFG | STU | Heating | 0-50 | Important | Good | -- |
| 001 | 0004 | TEMP.ADJ. | GHI | STU | Heating | 0-50 | Important | Good | -- |
| 001 | 0005 | FLOAT | JKL | XYZ | Heating | 0-50 | Important | Good | -- |
| 001 | 0006 | TEMP.ADJ. | GHI | STU | Heating | 0-50 | Important | Good | -- |
| 001 | 0007 | TEMP.ADJ. | EFG | STU | Heating | 0-50 | General | Good | -- |
| 001 | 0008 | THERMO | CDE | XYZ | Heating | 0-50 | General | Good | -- |
| 001 | 0009 | THERMO | CDE | XYZ | Heating | 0-50 | General | Good | -- |
| 001 | 0010 | TEMP.ADJ. | GHI | STU | Heating | 0-50 | General | Good | -- |
| 001 | 0011 | THERMO | CDE | XYZ | Heating | 0-50 | General | Leak/Large | -- |
| 001 | 0012 | DISC | LMN | STU | Drip | 50-150 | Important | Not Checked Yet | -- |
| 001 | 0013 | THERMO | CDE | XYZ | Drip | 50-150 | Important | Not Checked Yet | -- |
| 001 | 0014 | DISC | LMN | STU | Drip | 50-150 | Important | Not Checked Yet | -- |
| 001 | 0015 | DISC | LMN | STU | Drip | 50-150 | Important | Not Checked Yet | -- |
| -- | -- | -- | -- | -- | -- | -- | -- | -- | -- |

FIG.3

POSITION FINDER, MEASURING APPARATUS WITH POSITION FINDER, AND MEASURING SYSTEM

FIELD OF THE INVENTION

The present invention relates to a position finder enabling a person to find his or her current position in relatively large areas, such as a plant and a large factory. The present invention relates also to a measuring apparatus with such position finder and to a measuring system using the measuring apparatus.

BACKGROUND OF THE INVENTION

A steam-utilizing plant is an example of a large-premise plant. A steam-utilizing plant includes a large number of steam traps which automatically discharge drain from piping. Steam leakage from the steam traps decreases the productivity of the plant. It is, therefore, very important to periodically monitor the steam traps to know whether they are operating well and to systematically analyze the results of monitoring.

Steam leakage is usually measured by way of a portable measuring apparatus. An operator goes to locations where steam traps are mounted with such measuring apparatus and sees whether or not any steam is leaking from a steam trap and, if steam is leaking, measures how much steam is leaking. Measurement data obtained is stored in a memory of the measuring apparatus. When the operator finishes measurements for given steam traps, he or she brings the measuring apparatus to a control center and inputs the measurement data into a host computer disposed in the control center. The host computer analyzes the measurement data of respective steam traps obtained by the measuring apparatus.

For measuring steam leakage from a number of traps, an operator is to know where in a plant traps are mounted and what types of traps they are. For that purpose, drawings or maps on which locations of the respective traps in the plant are taken with and referred to by the operator when measuring steam leakage. However, the use of such drawings is inefficient. Also, it is sometimes very difficult for the operator to immediately find where in the plant he or she is from such drawings, which also lowers the working efficiency.

Frequently, plural operators are employed to measure steam leakage from traps. They may independently and simultaneously make required measurements for traps. In such a case, it may sometimes happen that one operator measures steam leakage from a trap which has already been measured by other operator.

Further, sometimes measuring operation is done by outside people who are not familiar with the plant premise. Therefore, the measuring operation is not done efficiently.

The larger plants are, the more these problems are.

Measurements obtained by measuring apparatuses are transferred together to a host computer after measurement for all or a predetermine number of traps has been done. Accordingly, it is impossible to know the progress of the measuring operation and the results of measurements in real time.

Therefore, an object of the present invention is to provide a position finder with which an operator can find his or her current location in a large-premise plant, e.g. a steam-utilizing plant. Another object of the present invention is to provide a measuring apparatus and system, which makes use of such position finder in making measurements for devices so that measurements can be taken with a high efficiency.

SUMMARY OF THE INVENTION

A position finder according to the present invention includes an identification data taking arrangement. A plurality of identification devices are disposed at appropriate locations within a given area. Each identification device has its own identification data. The identification data taking arrangement takes such identification data from each identification device. The position finder further includes a first memory in which information relating to the respective ones of the identification devices has been stored. The information stored in the first memory includes the identification data. A first display control arrangement causes an area picture showing the given area to be displayed on a display screen of a display, and also causes symbols for the respective identification devices to be displayed at locations on the area picture corresponding to the locations of the respective identification devices in the predetermined area.

When the identification data of any one of the identification devices is taken by the identification data taking arrangement, the first display control arrangement checks the taken identification data with the information stored in the first memory to identify the identification device corresponding to the identification data taken by the identification taking arrangement and make the display of the symbol for the identified identification device in a different manner from the others.

The position finder may be provided with a second display control arrangement which, when an external information-display command is applied to it, causes part or all of the information stored in the first memory relating to the identified identification device, to be displayed in, for example, an alphanumeric form, on the display screen.

The first display control arrangement may be so arranged as to be capable of changing the scale on which the area is displayed on the display screen in response to an external command to change the display scale.

If there are plural areas, plural area pictures corresponding to the areas are provided. The first display control arrangement may be so arranged as to cause, when the identification data taking arrangement takes identification data of an identification device in one of the plural areas, the area picture of that area, where the identification device is disposed, to be displayed on the display screen.

The position finder according to the present invention can be used in a measuring apparatus with measuring device for measuring a given physical quantity of an object. In this case, the identification device is mounted on or near the object.

The identification device may have, as the identification data, data relating to an object in association with which the identification device is mounted, and the information stored in the first memory includes a parameter required for precise measurement of the given physical quantity of the object. The measuring apparatus may include an arrangement for retrieving a parameter, from the first memory, relating to the object corresponding to the identification data taken in by the identification data taking arrangement, and automatically setting the retrieved parameter in the measuring device.

The measuring apparatus may be provided with a first storage control arrangement for causing measurement data obtained by measuring the given physical quantity of the object to be stored in the first memory. In this case, a third display control arrangement is also provided for determining whether or not each object has its physical quantity measured already, based on the stored content which has been stored in the first memory by the first storage control means, and causing the symbol for an object of which the physical quantity has been already measured to be displayed in a different manner than an object of which the physical quantity has not yet been measured. The stored content which the determination is based on may be whether or not the data obtained by the measurement is in the first memory.

The measuring apparatus may be provided with a fourth display control arrangement which operates, based on the stored content, e.g. the measurements for objects, stored in the first memory by the first storage control arrangement, to cause the symbol of a normally operating object to be displayed in a different manner than a faulty object.

The measuring apparatus of the present invention may be provided with a first transmitter arrangement for transmitting measurement data relating to the measurements of the given physical quantity of an object obtained by the measuring device. A measuring system can be provided by a combination of the measuring apparatus having the first transmitter arrangement and a host device having a first receiver arrangement for receiving the measurement data from the measuring apparatus. The host device is provided with a second memory for storing therein information relating to objects whose physical quantities are measured, and a second storage control arrangement for causing the measurement data received by the first receiver arrangement to be stored in the second memory.

In the measuring system according to the present invention, the measuring apparatus may be provided with, in addition to the first transmitter arrangement, a second receiver arrangement for receiving externally supplied renewal data. In this case, the first storage control arrangement of the measuring apparatus causes the renewal data to be stored in the first memory, too. A plurality of such measuring apparatuses are provided. The first receiver arrangement of the host device is adapted to receive measurement data from each of the measuring apparatuses. The host device is provided with a second transmitter arrangement for transmitting the measurement data received from each measuring apparatus as the renewal data back to the other measuring apparatuses.

BRIEF DESCRIPTION OF THE DRAWINGS

FIG. 3 is a conceptional view of contents stored in a memory unit provided in the measuring apparatus shown in FIG. 1.

DETAILED DESCRIPTION

Figure 1:
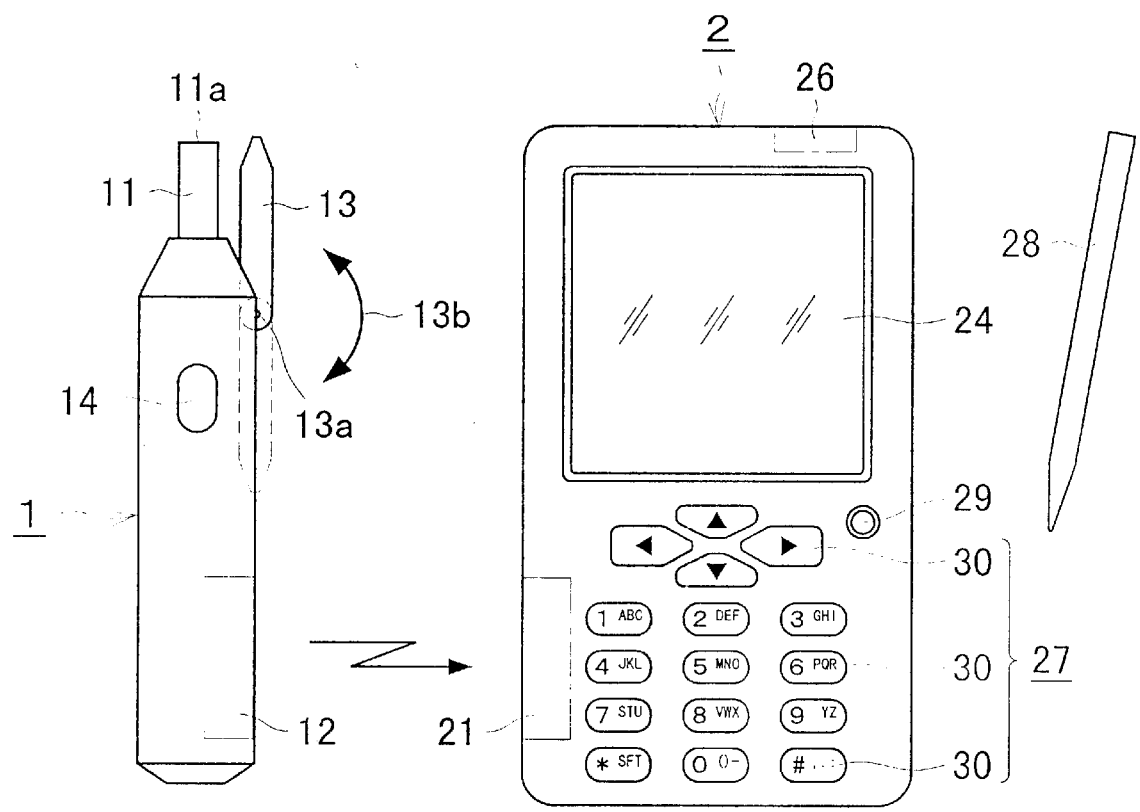
FIG. 1 shows a measuring apparatus according to one embodiment of the present invention.

A measuring apparatus used in one embodiment of the present invention operates to detect steam leakage from a trap and to determine an amount of leaking steam, on the basis of the fact that when steam leaks from a steam trap, ultrasonic vibrations having a magnitude determined by the amount of leaking steam are generated in the trap. As shown in FIG. 1, the measuring apparatus includes a generally rod-shaped probe 1 and a generally flat, box-shaped base unit 2.

The probe 1 has such a size as to be grasped by a hand, and has a cylinder-shaped detecting section 11 at its one end. A tip end 11a of the detecting section 11 is adapted to be urged against a casing of a trap (not shown) to detect ultrasonic vibrations generated in the trap which would be caused when steam is leaking from the trap. The detector 11 develops a vibration-representative signal representing the detected ultrasonic vibrations and couples the vibration-representative signal to an infrared transmitter 12 built in the probe 1 at a location near the other end. The vibration-representative signal is converted to an infrared signal in the infrared transmitter 12, and the infrared signal is sent to the base unit 2.

The base unit 2 is generally of a palm size, and has a receiver 21 therein for receiving the infrared signal sent from the probe 1. As shown within a dash-dot-dash line box in FIG. 2, the base unit 2 includes a CPU 22 into which inputted is the vibration-representative signal sent in the form of the infrared signal from the probe 1 and received by the receiver 21.

The CPU 22 determines whether or not steam is leaking from a trap and, if steam is leaking, how much steam is leaking, on the basis of the correlation between the vibration-representative signal and the amount of steam leaking, The CPU 22 stores the results of determination in a memory unit 23, e.g. a semiconductor memory, and, at the same time, displays the results on a display 24. The results of determination made by the CPU 22 are coupled through an input/output (I/O) interface 25 to a data input/output (I/O) terminal 26 of the base unit 2 for application to an external device. As will be described later, a wireless transceiver 3 may be connected to the data I/O terminal 26.

The correlation between a vibration-representative signal and steam leakage differs from trap to trap. Accordingly, in order for the CPU 22 to make precise determination of the presence of steam leakage and the amount of leaking steam, the CPU 22 uses the data representing the correlation between the vibration-representative signal and the amount of steam leaking (hereinafter referred to correlation data) for a particular trap of which ultrasonic vibrations are to be measured. For that purpose, the memory unit 23 has stored therein data of a number of correlations for various types of traps on the basis of, for example, management numbers assigned to the respective traps. Correlation data for a particular trap is selected through an operation section 27 by, for example, inputting the management number of that trap. As will be described later, the selection of appropriate correlation data for a particular trap can be done in response to the identification data of that trap sent from the probe 1, separate from the vibration-representative signal.

The display 24 is, for example, a dot-matrix type liquid crystal display panel capable of displaying graphics, and is disposed in a front, upper portion of the base unit 2, as shown in FIG. 1. The liquid crystal panel 24 is a touch panel, and various display operation elements (not shown in FIG. 1) forming part of the operation section 27 are provided in the display screen of the panel 24. The operation elements can be activated by pressing them with, for example, a hard resin touch pen 28. In the portion of the front surface of the base unit 2 below the display 24, a power switch 29 and a plurality of keys 30 for various functions are arranged. The keys 30 form the remaining portion of the operation section 27.

In addition to the above-described measuring function for determining the presence of steam leakage and the amount of leaking steam, the measuring apparatus according to the present invention has a function by which an operator of the measuring apparatus can know his or her current position.

Let it be assumed, for example, that a number of steam traps are disposed at locations in each of areas (e.g. factories) of a steam plant, that the respective traps are assigned with individual management numbers (trap numbers) by a plant manager for specifying the respective traps, and that identification devices with trap identification data are mounted on or near the respective traps, for identifying the individual traps. The identification device may be, for example, labels bearing identification data in the form of bar codes representing respective trap management numbers.

The measuring apparatus according to the present invention is provided with an identification data taking arrangement, for example, an arrangement for reading the bar codes, disposed in the probe 1. A rod-shaped member 13 extending in the length direction of the probe 1 substantially in parallel with the detecting section 11 shown in FIG. 1 is a bar code reader. The bar code reader 13 includes a bar code reading sensor (not shown) at its distal end. The proximal end of the bar code reader 13 is pivotally coupled to the probe 1 by a pivot 13a on the side of the probe 1 so as to be rotatable by about 180 degrees as indicated by an arrow 13b.

For reading a bar code, the distal end of the bar code reader 13 is rotated to face a bar code bearing label, and a data readout switch 14 is pressed. With the data readout switch 14 pressed, the bar code is scanned with the bar code reading sensor. The management number information read out is applied to the infrared transmitter 12 as identification data. The infrared transmitter 12 converts the identification data into an infrared signal and transmits it to the base unit 2.

The memory unit 23 within the measuring apparatus base unit 2 has stored therein detailed data of all traps used in the steam plant, such as area numbers (Area No.) assigned to the areas where respective traps are disposed, types of the traps (Trap Type), models of the traps (Model), manufacturers of the traps, applications of the traps, steam pressures under which the traps are operated, importance of the traps (Priority), results of measurements for the traps (Result) etc. The data is stored in the form of a list, being arranged on a management number basis, as shown in FIG. 3. The memory unit 23 also contains a control program for controlling operation sequences of the CPU 22.

Figure 4:
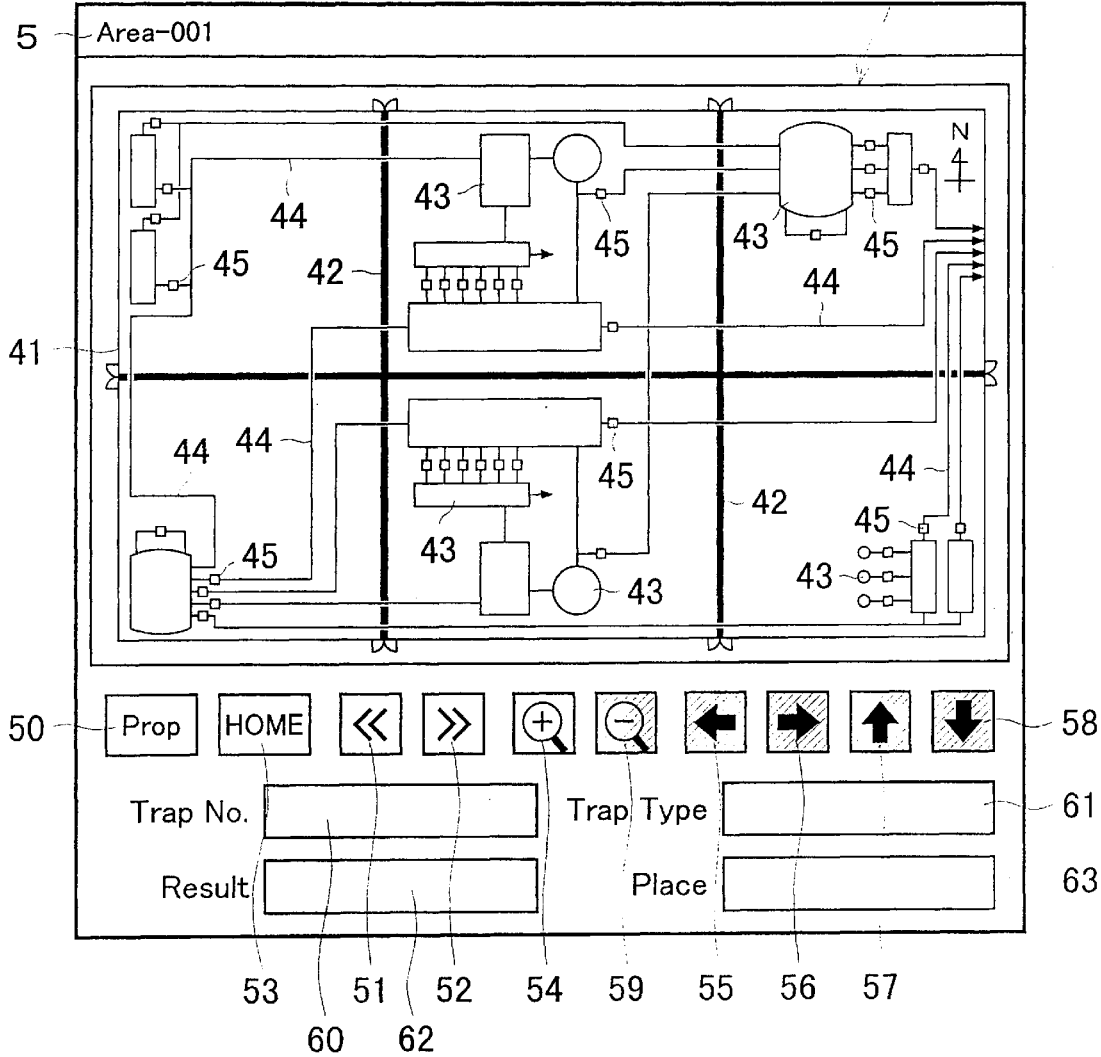
FIG. 4 is an example of picture displayed on a display screen of the measuring apparatus shown in FIG. 1.

When the power switch 29 on the base unit 2 is turned on, the CPU 22 causes a default (initial) picture like the one shown in FIG. 4 to be displayed on the screen of the display 24 in accordance with the control program. The default picture is of a rough plan view 4 of the entire of a particular one of the areas, for example, the view of the area assigned with the area number "1", as indicated as "Area-001" at the upper left corner of the picture. In the plan view 4, the boundaries 41 of the area, such as the walls of the factory building, passages 42 in the area, various steam handling devices 43, such as vacuum pumps and heaters, steam piping 44, and steam traps 45 are shown by symbols.

The steam-trap representative symbols 45 are linked with data associated with the respective traps stored in the memory unit 23. As is described in detail later, when the data of one trap in a "Result" section in the picture shown in FIG. 4 is renewed, the display of the symbol 45 for that trap changes. When one of the symbols 45 is touched with the touch pen 28, the data of the trap corresponding to the touched symbol 45 is called out of the memory unit 23 and is displayed on the display 24.

The data relating to the plan view 4, too, is stored in the memory unit 23.

The CPU 22 causes a horizontally elongated title box 5 to be displayed in the upper portion of the plan view 4. In the title box 5, the area number, "Area-001" in the currently described example, of the area being displayed is indicated. Below the plan view 4, a plurality, for example, ten, of buttons 50–59, which are operation element symbols, are displayed in a row. The functions of the buttons 50–59 will be described later.

Below the buttons 50–59, phrases, "Trap No.", "Trap Type", "Place" and "Result" are displayed in two rows and two columns. On the right sides of these phrases, horizontally elongated boxes 60–63 are displayed.

Figure 5:
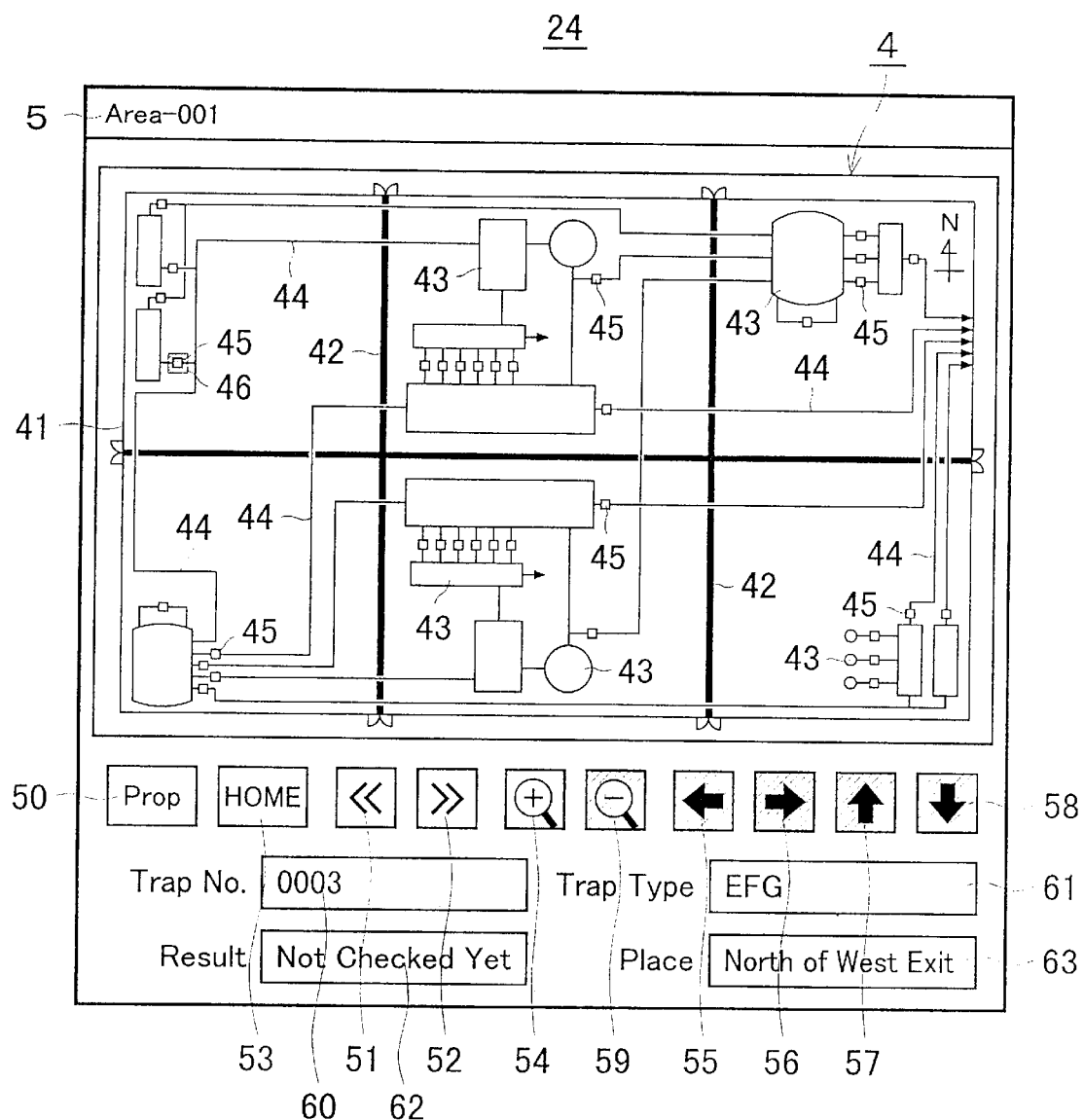
FIG. 5 shows another picture displayed on the display screen.

With the default picture displayed, the bar code reader 13 reads a bar code attached to one of the traps, e.g. a trap assigned with a trap management number "0003", disposed in the area "1". The identification data of the trap including the trap management number "0003" is sent from the probe 1 to the base unit 2 and inputted into the CPU 22. The CPU 22 calls, out of the memory unit 23, detailed data of the trap "0003" corresponding to the input identification data, and displays the plan view 4 of the area "1" in which the trap "0003" is disposed, based on the detailed data called out of the memory unit 23, as shown in FIG. 5. (If the trap "003" is in an area assigned with, for example, an area number "2", the plan view of the area "2" is displayed.) The symbol 45 for the trap "0003" to be measured is displayed in the upper left portion of FIG. 5. The CPU 22 attaches marking 46 to this symbol 45 for the trap "0003". Thus, the operator can know in which area and where in that area the trap "0003" is located, and, thus, he can instantly know where he or she is. Accordingly, in case the operator gets lost in some area, he or she can find his or her position by reading the bar code attached to a nearby trap. The CPU 22 acting in this manner corresponds to the first display control arrangement.

The CPU 22 causes the trap management number "0003" in the illustrated example, and the trap type "EFG", for example, of the trap "0003", to be displayed in the boxes 60 and 61 right to the phrases "Trap No."and "Trap Type", respectively. Also, the CPU 22 causes the result of measurement for the trap "0003" to be displayed in the box 62 to the right of the word "Result". In the illustrated example, an indication of "Not Checked Yet" is displayed, which means that the measurement has not yet been done for the trap "0003". In the box 63 on the right side of the "Place", the location of the trap "0003" is indicated verbally. The data about the locations to be verbally displayed is also stored in the memory unit 23. From these displays in the boxes 60–63, the operator can collect data for the trap of which ultrasonic vibrations are to be measured.

At the same time, the CPU 22 calls the correlation data for the trap to be measured, from the memory unit 23 in accordance with the identification data, and automatically sets it. It should be noted that the setting of the correlation data or parameter for use in measurement need not be done by manually operating the keys 30 in the operation section 27. The CPU 22 referred to herein corresponds to the setting arrangement.

Figure 6:
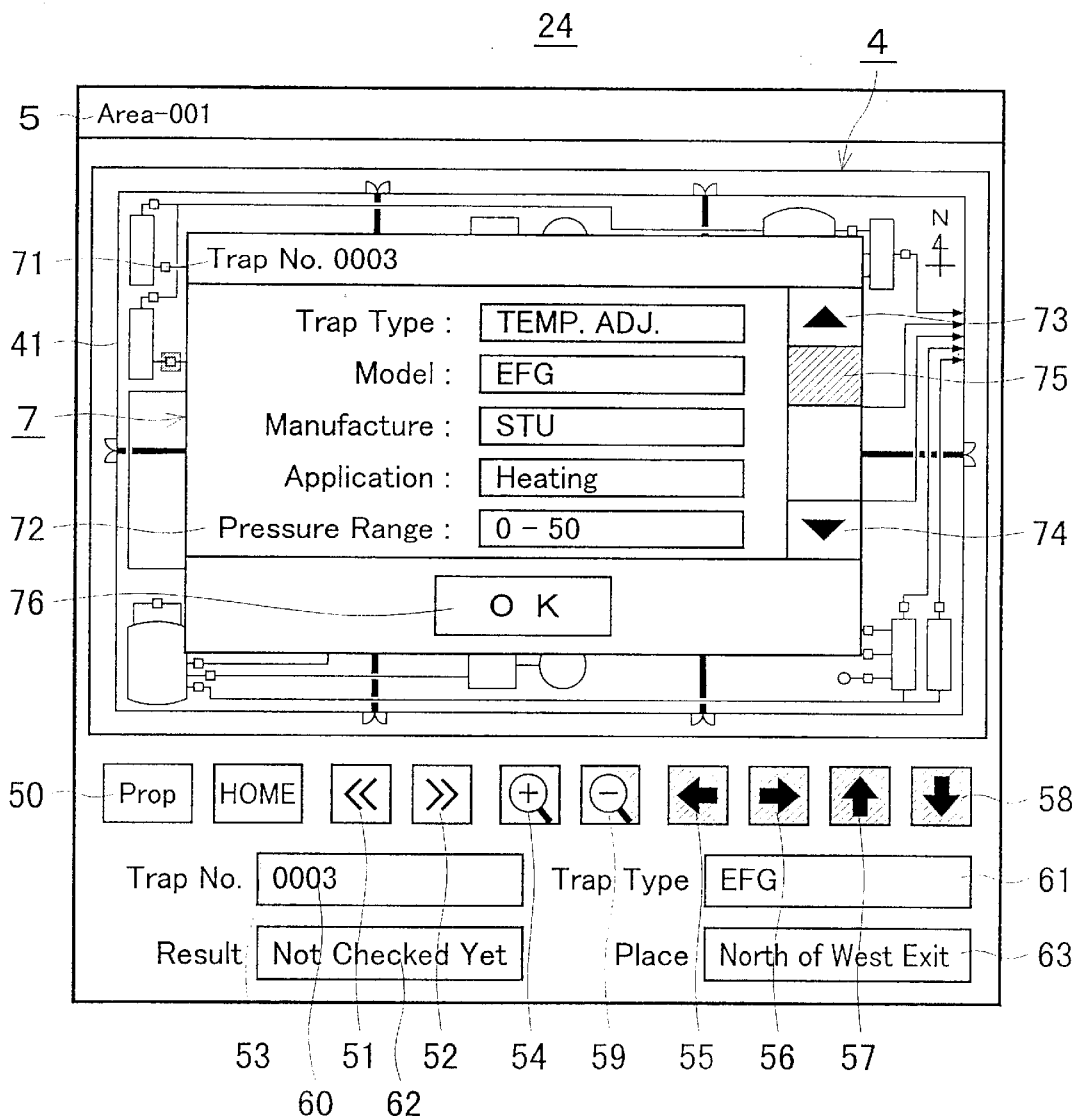
FIG. 6 shows a still other picture displayed on the display screen.

When the leftmost button 50 labeled "Prop" in the row located immediately beneath the plan view 4 is touched with the touch pen 28, the CPU 22 causes a slightly smaller window 7 to be displayed over the picture of the plan view 4, as shown in FIG. 6. The window 7 has a title box 71 in which displayed is the trap management number, "0003" in the illustrated example, of the trap of which the symbol 45, in the displayed plan view 4. is provided with marking 46. In a box 72 below the title box 71, part of the detailed data of the subject trap "0003" is displayed vertically. On the right edge of the box 72, upward and downward directed arrow buttons 73 and 74 are displayed with a spacing disposed between them. Pressing either of the buttons 73 and 74 with the touch pen 28 makes the display within the box 72 scrolled in the corresponding direction so that the operator can see all of the detailed data of the trap "0003". A scroll bar 75 is positioned between the arrow buttons 73 and 74. The window 7 can be closed or canceled by pressing a button 76 labeled "OK" disposed in the lower portion of the window 7.

The window 7 can be displayed also by touching the symbol 45 with the marking 46 with the touch pen 28. It is also displayed when any one of the other symbols 45 is touched. The touching of the symbols 45 or the "Prop" button 50 with the touch pen 28 corresponds to the application of an external information-display command, and the CPU 22 operating to display the window 7 in response to the operation of the symbols 45 or the button 50 corresponds to the second display control arrangement.

The buttons 51 and 52 are for switching the displayed area view 4. Although not shown, a plan view of a different area replaces the plan view 4 when either of the buttons 51 and 52 is pressed. More specifically, when the button 52 is pressed, the plan view of, for example, area numbered 002 is displayed in place of the plan view 4. Each time the button 52 is pressed, the plan view of the area having a successively increasing area number, 003, 004, . . . replaces the previous one. Similarly, each time the button 51 is pressed, the area with a successively decreasing area number is displayed.

If the button 53 labeled "HOME" is pressed when the plan view of an area other than the area where the trap whose ultrasonic vibrations are to be measured is disposed is displayed, the CPU 22 makes the plan view of the area where that trap is disposed displayed again. The other plan view is replaced by the plan view when the bar code of the trap represented by the symbol 45 with the marking 46, is read out again. For example, if the button 53 is pressed when the plan view of the area "2" is displayed, the plan view 4 is displayed again in place of the plan view of the area "2". Also, if the bar code of the trap "0003" is read again when the plan view of the area "2", for example, is displayed, the plan view 4 of the area "1" is displayed again in place of the plan view of the area "2".

Figure 7:
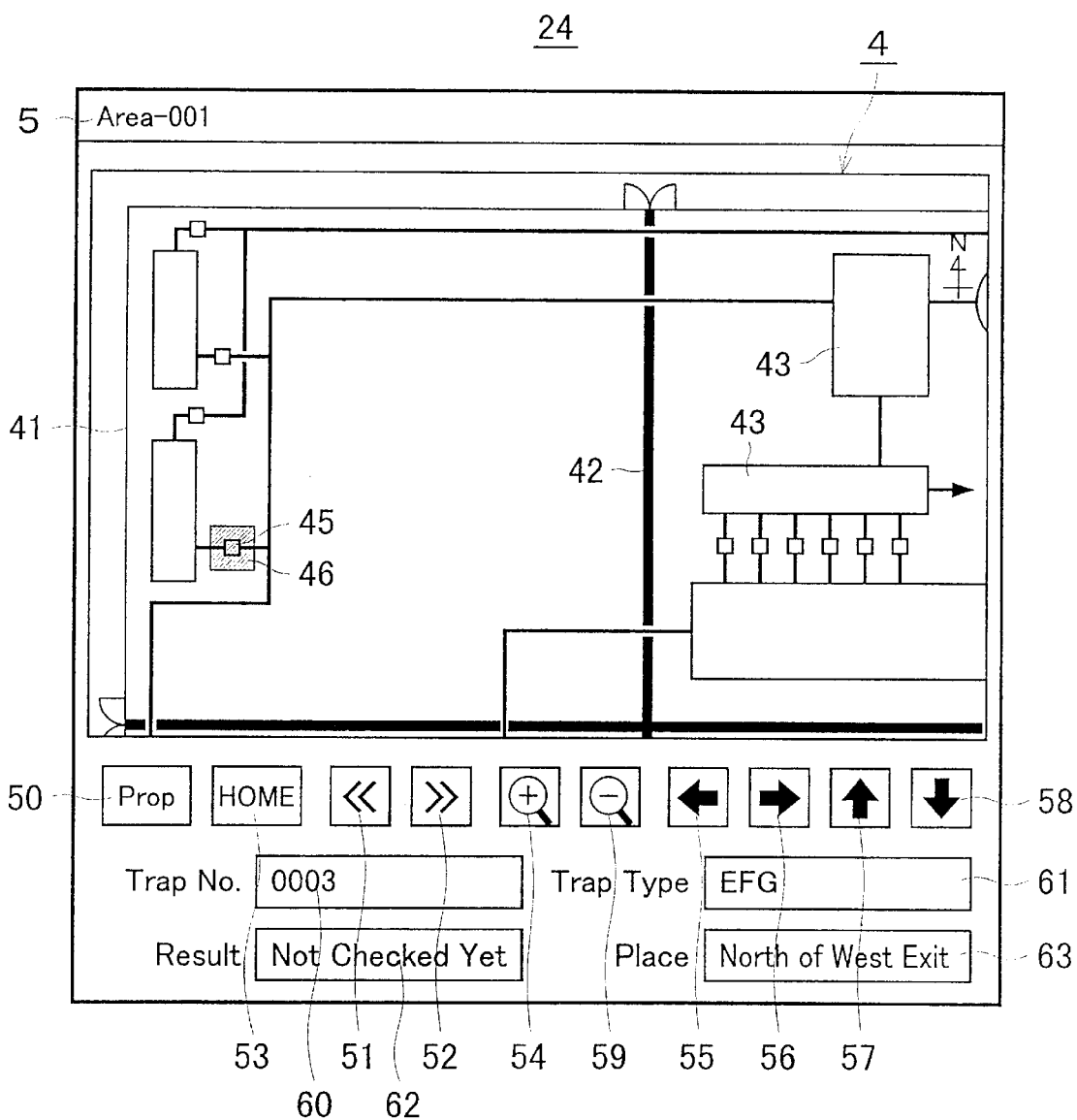
FIG. 7 shows a different picture on the display screen.

When the button 54 (scale-increasing button) fifth from the leftmost button 50 in the row is pressed, the CPU 22 causes an enlarged view of the region around the trap symbol 45 with the marking 46, like the one shown in FIG. 7, to be displayed. The operator can see the location of the trap "0003" more easily than FIG. 5 which shows the entire area "1".

If one of the four buttons 55, 56, 57 and 58 in the right side portion of the row is pressed when the enlarged view shown in FIG. 7 is on the screen, the displayed portion of the area is scrolled leftward, rightward, upward or downward, depending on the button pressed. Thus, details of other portions of the area can be seen.

If the button 53 is pressed after the displayed portion has been changed, the CPU 22 causes the enlarged view of the region about the trap symbol 45 with the marking 46, i.e. the view shown in FIG. 7, to be displayed, again.

If the button 50 is pressed when the view shown in FIG. 7 is displayed, the CPU 22 causes the window 7 to be displayed so that the detailed data of the trap of which symbol 45 is marked 46, i.e. the trap "0003" in the illustrated example, can be displayed.

The pressing of either of the buttons 51 and 52 changes the area displayed on the screen, as described previously.

Figure 8:
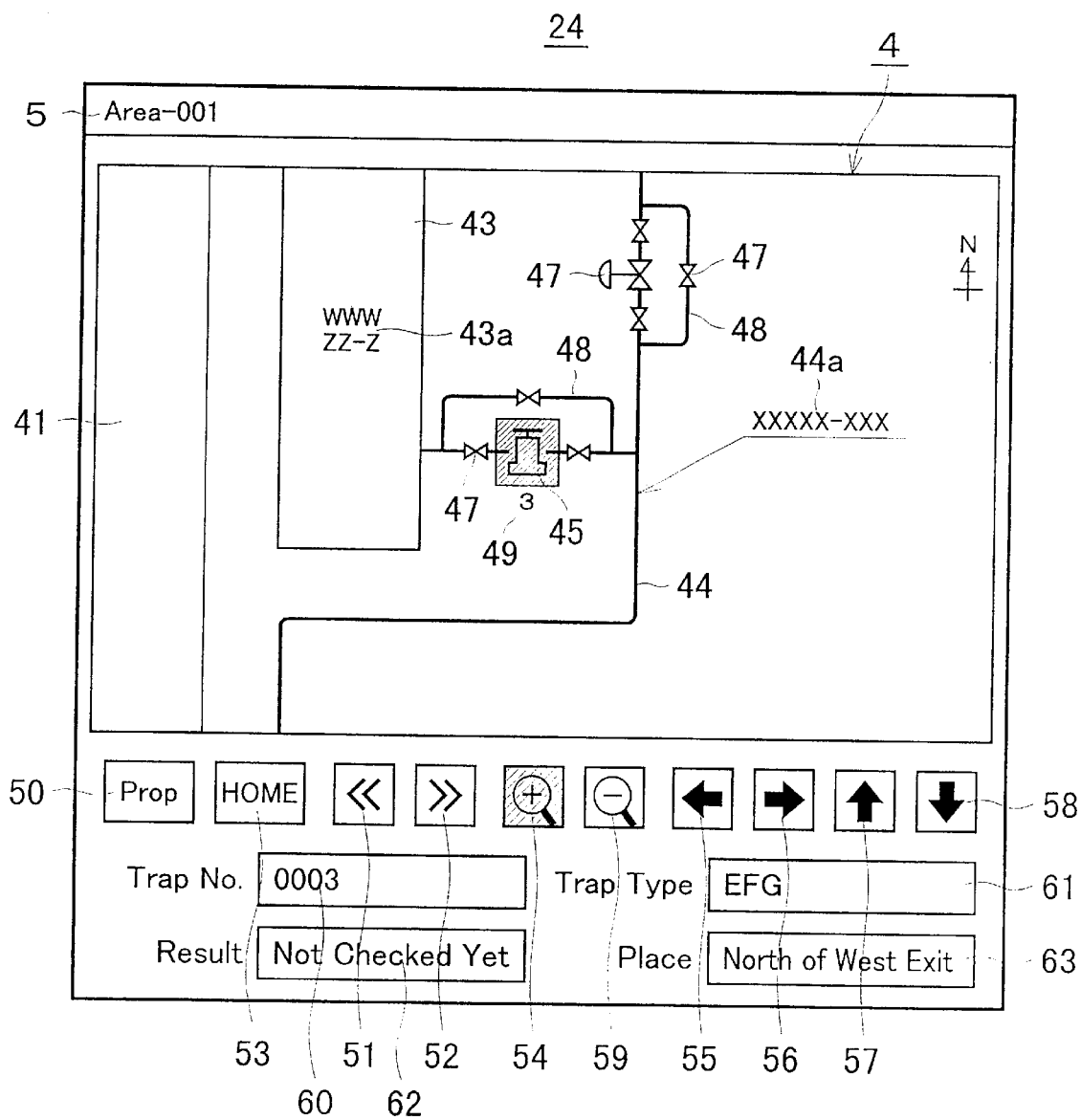
FIG. 8 shows a further different picture on the display screen.

If the enlargement button 54 is pressed further when the view shown in FIG. 7 is being displayed, a further enlarged, or detailed view of the region about the trap with the marking 46 is displayed as shown in FIG. 8, so that the operator can identify small valves 47, bypass pipes 48, an indication of the type 43a of a device 43, an indication of the route number 44a etc, which cannot be read on the pictures shown in FIGS. 5 and 7. In such an enlarged view as shown in FIG. 8, the trap symbols 45 are displayed in different forms, depending on the trap types. Accordingly, seeing such symbols 45, the operator can instantly know the types of the traps. Also, below each trap symbol 45, a trap management number 49, "3" in the illustrated example, is displayed, which enables the operator to know the trap management number without looking the box 60 below the plan view displayed. The functions of the buttons 50, 51, 52, 55, 56, 57 and 58 are the same as described with respect to the display shown in FIG. 7.

When the button 59 (scale-reducing button) sixth from the left is pressed, the CPU 22 causes the plan view to be displayed on a reduced scale. Each time the button 59 is pressed, the plan view is displayed on a smaller scale. For example, the pressing of the button 59 when the picture shown in FIG. 8 is being displayed, the plan view 4 is displayed to a smaller scale, as shown in FIG. 7, and the scale is further reduced by the further pressing of the button 59 so as to display the plan view 4 shown in FIG. 5.

The scale-reducing button 59 is made inoperable when the plan view of the entire area shown in FIG. 5 is displayed, and the button 59 changes its color to gray, for example, to indicate that the scale cannot be reduced any more. Also, when the picture shown in FIG. 5 is displayed, the scroll buttons 55–58 are also displayed in gray to indicate that the picture cannot be scrolled. In contrast, when an enlarged view shown in FIG. 8 is displayed, the CPU 22 causes the scale-increasing button 54 to be displayed in gray. The pressing of the scale-increasing button 54 or the scale-reducing button 59 corresponds to the application of an external display scale change command.

The result of measurement for a trap taken with the measuring apparatus according to the present invention is stored in the column for the measurement results in the memory unit 23 shown in FIG. 4, as described previously. If a particular trap is operating normal, data representing "Good" is stored in the "Result" column in the region for that particular trap. If a trap is determined to be faulty, for example, if the trap leaks a large amount of steam, "Leak/Large" is stored in the "Result" column, in the region for that trap, as the trap No. 0011 in FIG. 4. In the regions in the "Result" column for those traps of which ultrasonic vibrations have not yet been measured, data corresponding to "Not Checked Yet" is written.

When the measurement is taken for traps, the CPU 22 changes the form of the display of the symbols 45 for such traps. For example, the symbols for those traps the measurements for which have been done may be colored as represented by symbols 45a in FIG. 9, so that the operator can instantly distinguish checked, or measured traps from unchecked traps. Alternatively, the symbols for unchecked traps may be colored. In other words, the symbols for checked and unchecked traps can be displayed in any forms only if they can be easily distinguished. The CPU 22 in this context corresponds to the third display control arrangement.

Figure 9:
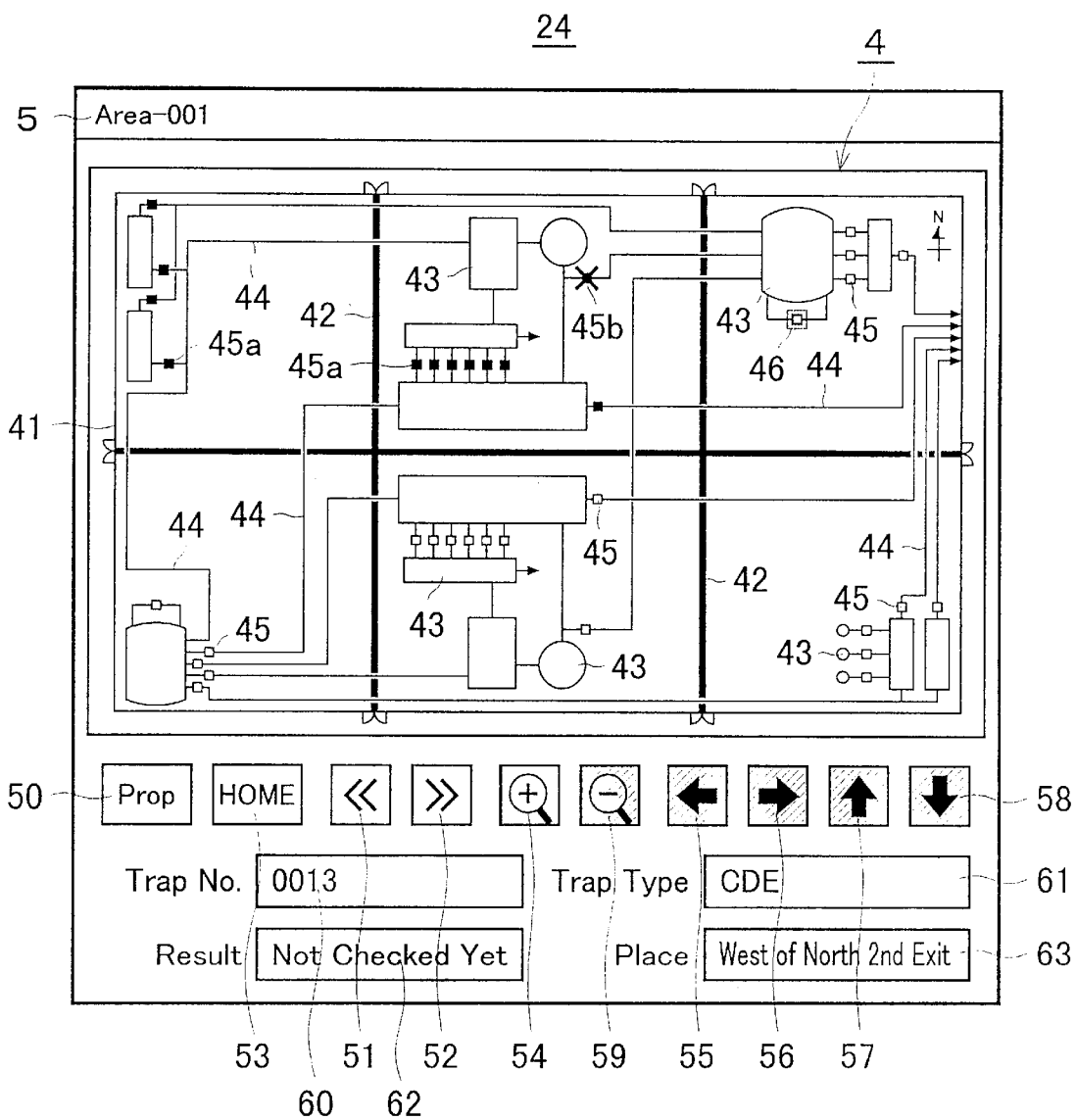
FIG. 9 shows a picture on the screen different from the ones shown in FIGS. 4 through 8.

The CPU 22 superimposes a marking, for example, "X" on the symbols 45 for those traps which have been judged faulty, as represented by a symbol 45b in FIG. 9. By this marking, the operator can instantly distinguish faulty traps from normally operating traps on the screen. Instead of superimposing the marking "X" on the symbols 45 for faulty traps, the symbols 45 for normal traps may be circled. In other words, they may be displayed in any manner only if faulty traps can be distinguished from normal ones on the screen. The CPU 22 in this context corresponds to the fourth display control arrangement.

Because of many traps used in a steam plant as described above, the measuring working is frequently divided among a plurality operators, and they may work at the same time. The measurements obtained from a plurality of measuring apparatuses are inputted together into a common host computer. Now, a system for collecting and analyzing the measurements for a plurality of traps with the host computer is described.

In the illustrated example of the present invention, the measurements for the respective traps obtained by the measuring apparatuses are transmitted to the host computer by a wireless communication technique. In the illustrated example, each time a trap is checked by the measuring apparatus, the measurement is sent to the host computer so that the host computer can know substantially in real time how the measurement is done by each measuring apparatus. Also, when the measurement made by one measuring apparatus is sent to the host computer, it can be forwarded to another measuring apparatus from the host computer so that each operator can see, on his measuring apparatus, the measurement results obtained by other measuring apparatuses.

Figure 2:
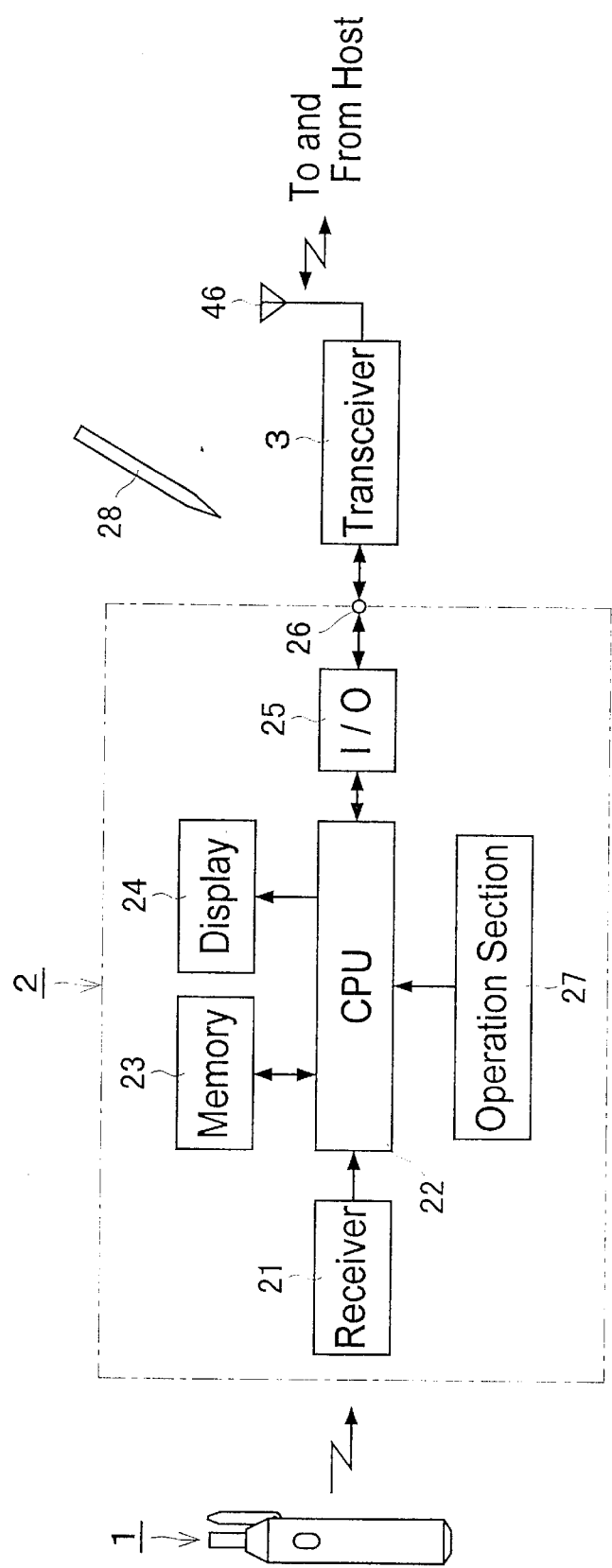
FIG. 2 is a schematic block circuit diagram of the measuring apparatus shown in FIG. 1.

To realize it, a wireless transceiver 3 is connected to the data input/output terminal 26 disposed on top of the base unit 2 of each measuring apparatus (see FIGS. 2 and 3). The wireless transceivers 3 may be small power transceivers.

Figure 10:
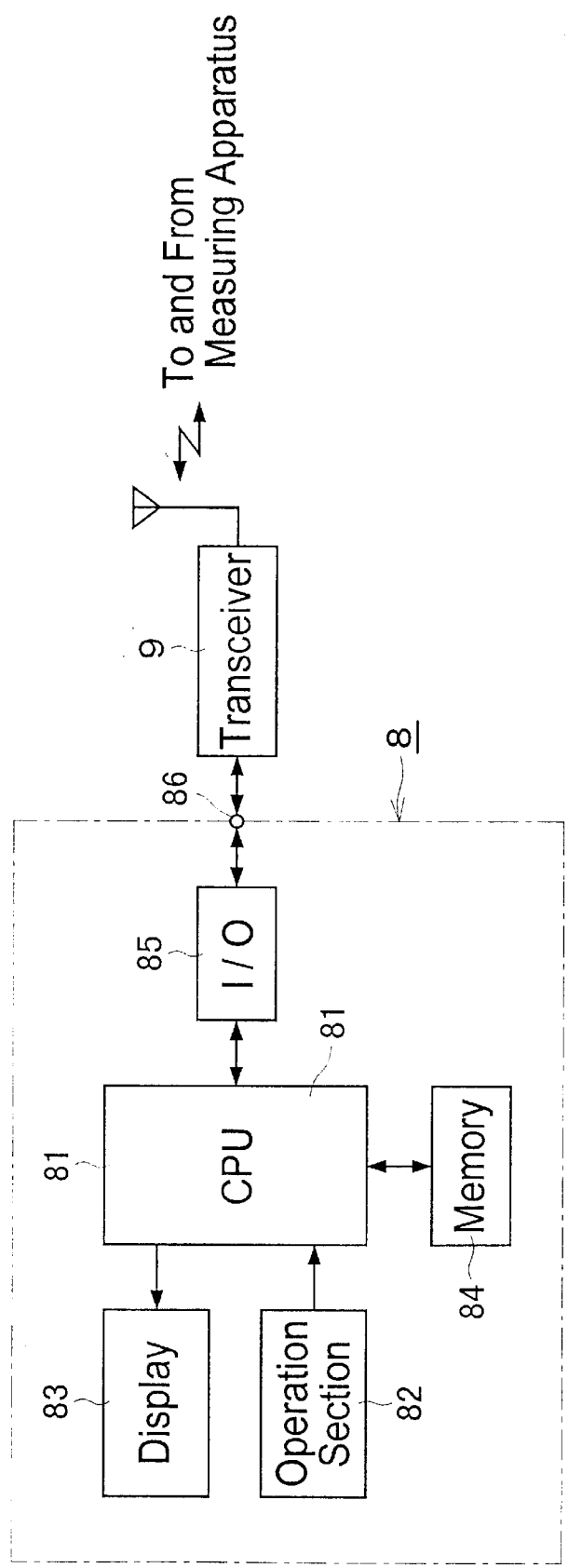
FIG. 10 is a schematic block circuit diagram of a host computer used with the measuring apparatus shown in FIG. 1.

The wireless transceiver 3 corresponds to the first transmitter arrangement and second receiver arrangement. A similar wireless transceiver 9 is connected to the host computer. FIG. 10 is a schematic block circuit diagram of the host computer 8.

As shown in FIG. 10, the host computer 8 includes a CPU 81, to which an operation section 82, a display 83, a memory unit 84 and input/output (I/O) unit 85 are connected. The host computer 8 may be a personal computer, for example. The operation section 82 includes a mouse and a keyboard, which are not shown. The display 83 may be, for example, a CRT display or liquid crystal display. The memory unit 84 may include, for example, a semiconductor memory and an external memory device, such as a hard disc. The wireless transceiver 9 is connected through a data input/output terminal 86 to the I/O unit 85. The wireless transceiver 9 corresponds to the first receivers and the second transmitter arrangement.

Figure 11:
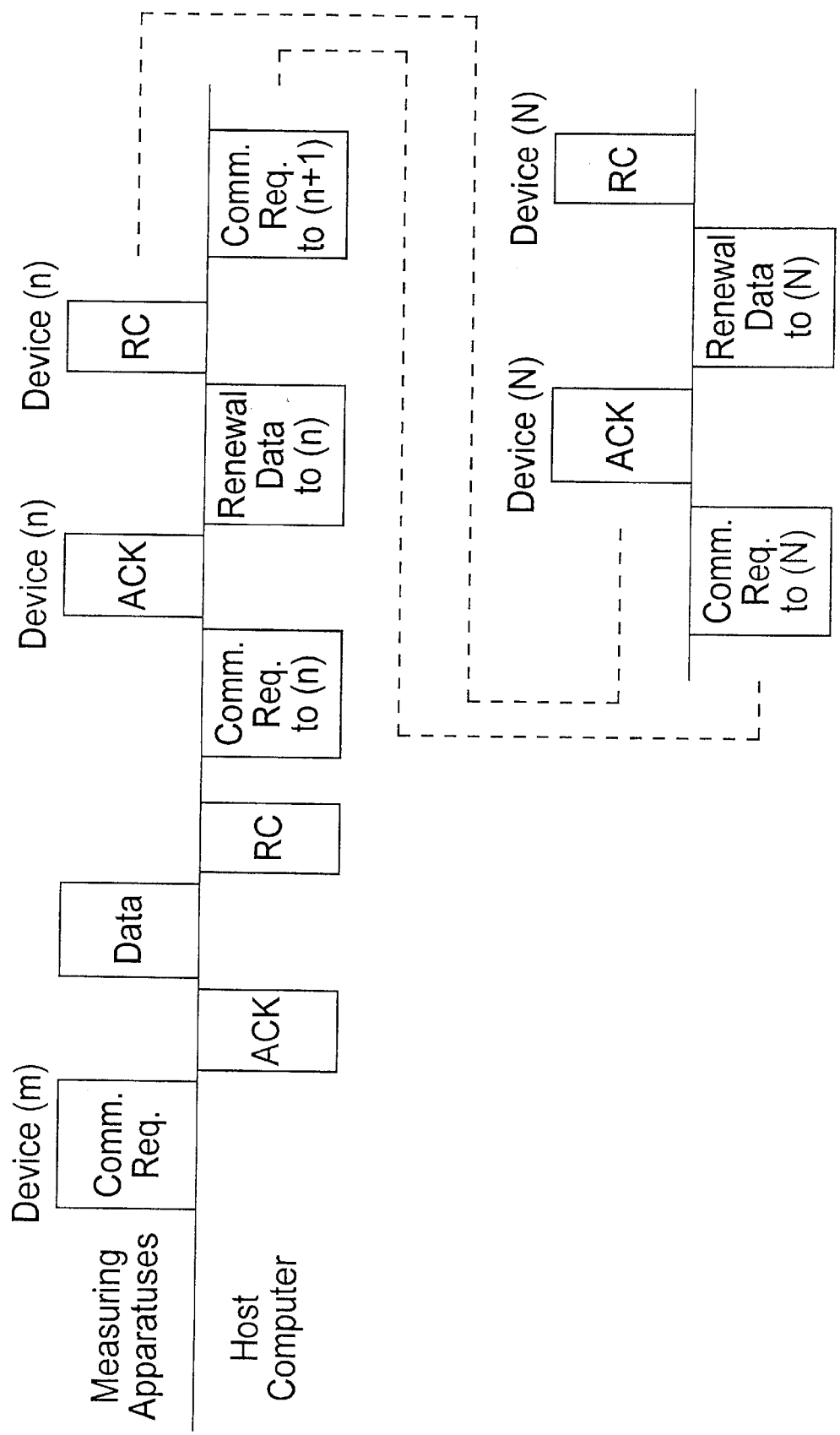
FIG. 11 illustrates a command sequence representing a protocol employed for data transfer between the measuring apparatuses and the host computer.

A plurality, N, of measuring apparatuses each having the wireless transceiver 3 are provided. Each of the N measuring apparatuses is assigned with its own number (n). The number (n) is one of the numbers of from 1 to N. A host computer 8 is provided in a center control room. The host computer 8 is common to the measuring apparatuses 1 through N. In this system, as shown in FIG. 11, when one measuring apparatus (m) finishes the measurement for a particular trap, a communication request signal is sent from the measuring apparatus (m) to the host computer 8 through the transceivers 3 and 9. By receiving the communication request signal, the host computer 8 knows that the measuring apparatus (m) has finished the measurement for that particular trap. Provided that the host computer 8 is not currently communicating with other measuring apparatus, the host computer 8 sends an ACK signal to the measuring apparatus (m).

Receiving the ACK signal from the host computer 8, the measuring apparatus (m) knows that data transfer to and from the host computer 8 has now become possible. The measuring apparatus (m) transmits the obtained measurement for the particular trap to the host computer 8. In this way, the host computer 8 can obtain substantially in real time the measurement result for the particular trap obtained by the measuring apparatus (m), The host computer 8 stores the data received from the measuring apparatus (m) in the memory unit 84. When all of the measurement data is received by the host computer 8, a reception completion signal (RC) is transmitted from the host computer 8 to the measuring apparatus (m), and the host computer 8 ends the communications with the measuring apparatus (m). The memory unit 84 of the host computer 8 corresponds to the second memory, and the CPU 81 corresponds to the second memory control arrangement.

The host computer 8 polls the measuring apparatuses from the smallest-numbered one (n) to the measuring apparatus, (N), except the measuring apparatus (m), and transmits the data received from the measuring apparatus (m) successively to the respective ones of the remaining measuring apparatuses, as renewal data. Specifically, the host computer 8 transmits a transmission request signal to the smallest-numbered remaining measuring apparatus (n), and the measuring apparatus (n) receiving the transmission request signal sends back an ACK signal to the host computer 8. Receiving the ACK signal, the host computer 8 knows that data transfer to and from the measuring apparatus (n) has become available. Then, the host computer 8 transmits the data received from the measuring apparatus (m) to the smallest-numbered measuring apparatus (n), as renewal data. In this manner, the smallest-numbered measuring apparatus (n) can obtain substantially in real time the measurement for the particular trap taken by the measuring apparatus (m).

The measuring apparatus (n) stores, in its memory unit 23, the renewal data for the particular trap sent from the host computer 8 and sends a reception completion signal (RC) to the host computer 8 when all the renewal data has been received, so that the communications between the smallest-numbered measuring apparatus (n) and the host computer 8 is ended.

Upon receipt of the reception completion signal from the smallest-numbered measuring apparatus (n), the host computer 8 sends the renewal data to the measuring apparatus (n+1) assigned with the next larger number, in a manner similar to the above-described manner. In a similar manner, the host computer 8 sends the measurement data for the particular trap taken by the measuring apparatus (m) to all of the remaining measuring apparatuses, as renewal data, and ends the transfer of the data obtained for the particular trap by the measuring apparatus (m).

In the measuring apparatuses other than the device (m), in response to the renewal data sent from the host computer 8, the symbol 45 for the trap corresponding to the renewed data is changed, for example, in color like the symbols 45a shown in FIG. 9. Further, if the result of measurement shows that trap is not operating well, a marking "X" is attached, resulting in a symbol like the symbol 45b shown in FIG. 9.

As described, the result of measurement for one trap made by one measuring apparatus (m) is reflected substantially in real time on the remaining measuring apparatuses. Accordingly, different from the previously described prior art, it would not happen for a plurality of operators to take measurement for the same trap.

The symbol 45 for a trap one measuring apparatus has taken measurement may be displayed on the display of that measuring apparatus in a manner different from the symbols for traps another measuring apparatus have taken measurement, so that the operator using that measuring apparatus can instantly identify the traps he or she has taken measurement. For example, the symbols and/or the marking "X" for those traps which that measuring apparatus has taken measurement may be displayed in different color from the other symbols.

The host computer 8 collects and analyzes the measurement data from the respective measuring apparatuses, sees the operating states of the respective traps, and judges how the operating states of the respective traps give effects on the entire productivity of the plant. The program for the host computer 8 according to which such judgment is made is not pertinent to the present invention, and it is not described in this specification.

Figure 12A:
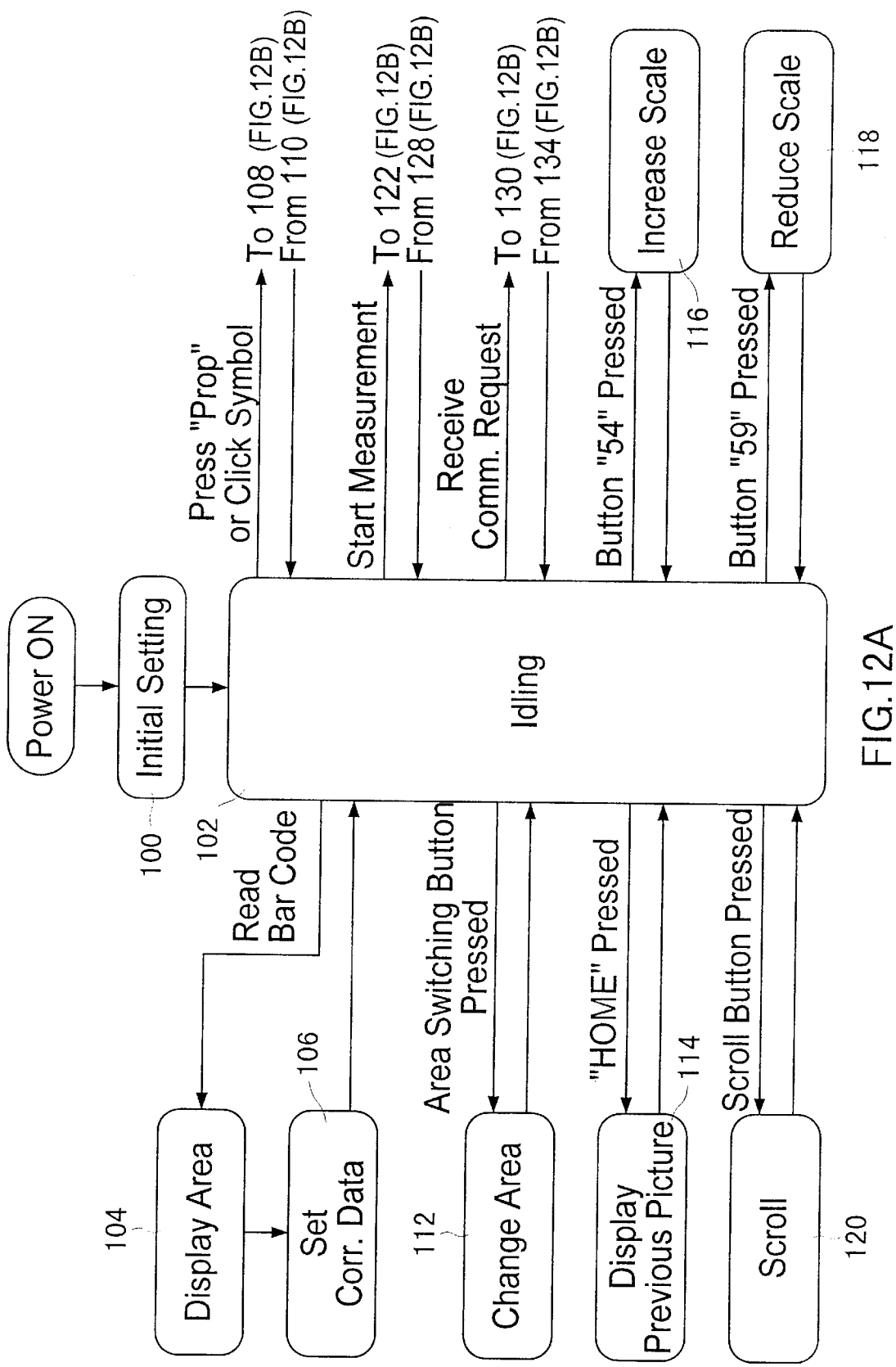
FIGS. 12A and 12B together show a transition diagram exemplifying the operation of a CPU of the measuring apparatus.
Figure 12B:
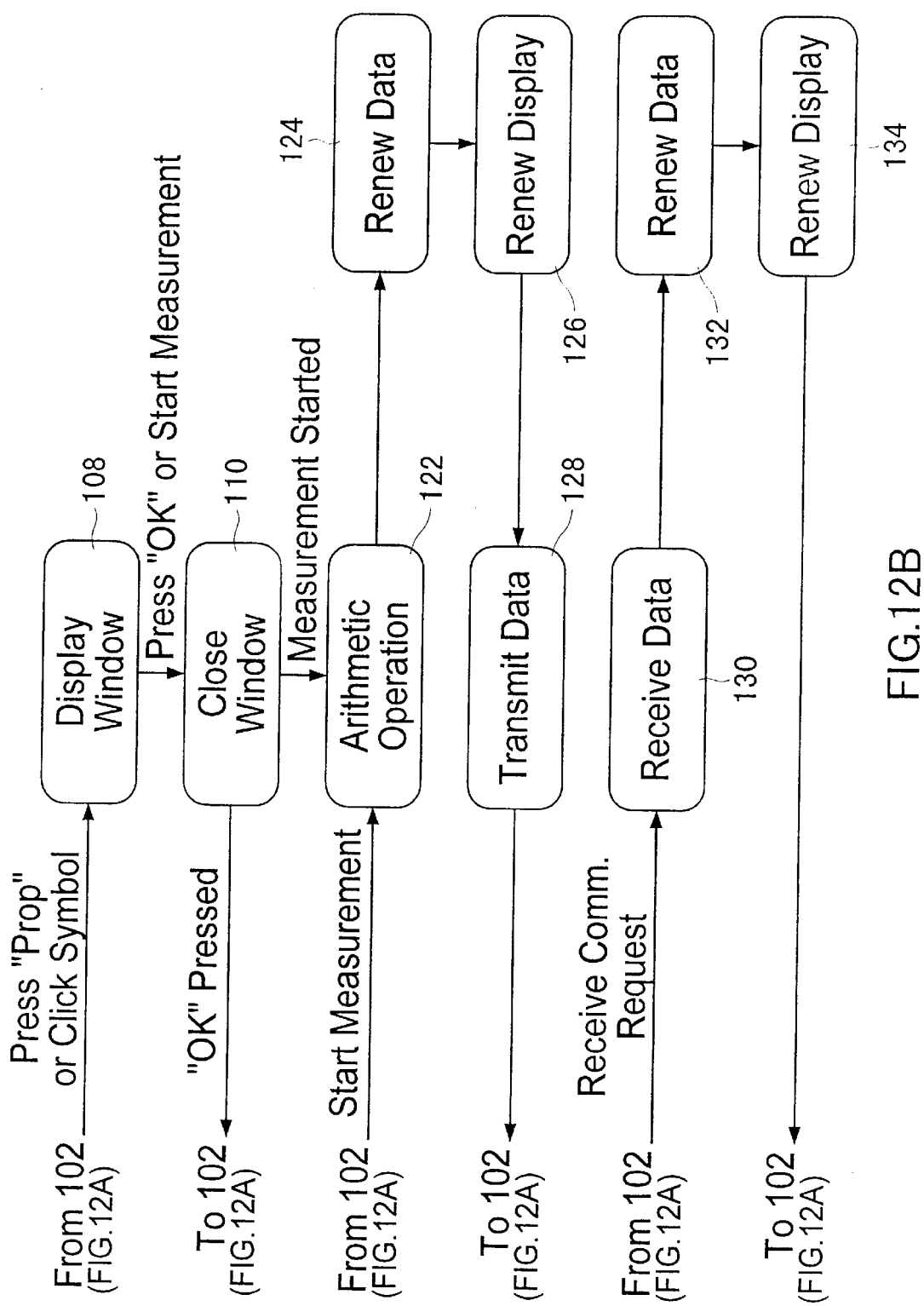

The state transitions in the sequential operation of the CPU 22 in each of the measuring apparatuses are shown in FIGS. 12A and 12B.

As shown in FIG. 12A, when the power switch 29 on the base unit 2 is turned on, the CPU 22 executes an initial setting processing 100. The CPU 22 causes the default, or initial picture shown in FIG. 4 to be displayed on the display screen of the display 24. Following the initial setting 100, the CPU 22 enters into an idling state 102 where it awaits any data or command applied to it. For example, when a bar code assigned to a certain trap is read by the probe 1 during the idling state 102 of the CPU 22, the identification data read out by the probe 1 is inputted to the CPU 22, and the CPU 22 executes an area view displaying processing 104.

In the area view display processing 104, the CPU 22 displays on the display screen, a rough plan view 4 of the area where the trap corresponding to the inputted identification data us disposed. At the same time, the CPU 22 superimposes the marking 46 on the symbol 45 for that trap. After that, the CPU 22 executes a correlation data setting processing 106, in which the correlation data for the trap corresponding to the identification data is set. Then, the CPU 22 returns to the idling state 102.

Thereafter, the "Prop" button 50 is pressed, while the CPU 22 is in the idling state 102, and the CPU 22 executes a window display processing 108, so that the window 7 shown in FIG. 6 is displayed. Detailed data of the trap with the marking 46 is displayed in the box 73 within the window 7. By pressing either of the arrowed buttons 73 and 74, the picture within the box 72 is scrolled up or down. The pressing of the "OK" button 76, the CPU 22 executes a window display ending processing 110 to close the window 7, and then returns to the idling state 102.

The CPU 22 executes the window display processing 108 also when any of the symbols, including the symbols with the marking 46, is touched with the touch pen 28. In this case, the detailed data displayed is that of the trap corresponding to the touched symbol 45.

When either of the displayed area switching buttons 51 and 52 is pressed while the CPU 22 is in the idling state 102, the CPU 22 executes an area switching processing 112, in which the plan view to be displayed on the display screen is changed. After switching the displayed area, the CPU 22 returns to the idling state 102.

If the button 53 is pressed in this stage, the CPU 22 executes a previous-picture display processing 114, in which the CPU 22 displays again the plan view 4 of the area in which the trap with the marking 46 is disposed. In other words, the picture displayed before the displayed area switching button 51 or 52 was pressed is displayed again. After that, the CPU 22 returns to the idling state 102.

When the scale-increasing button 54 in the display is pressed while the CPU 22 is in the idling state 102, the CPU 22 executes a scale-increasing processing 116, in which the plan view 4 is displayed in a larger scale so that greater details are displayed. After that, the CPU 22 returns to the idling, state 102. If no more larger scale display is available, i.e. if the plan view is displayed on the largest possible scale, the CPU 22 changes the color of the scale-increasing button 54 to gray, and, after that, it returns to the idling state 102.

If the scale-reducing button 59 is pressed when the CPU 22 is in the idling state 102, the CPU 22 executes a scale-reducing processing 118, in which the CPU 22 reduces the scale on which the plan view 4 is displayed. After that, the CPU returns to the idling state 102. If the plan view 4 being displayed cannot be displayed on a further reduced scale, the CPU 22 colors the button 59 gray and, then, returns to the idling state 102. In this case, the scroll buttons 55–58 are also colored gray.

If the scroll buttons 55–58 are operable when the CPU 22 is in the idling state 102, the CPU 22 executes a scrolling processing 120 when one of the scroll buttons 55–58 is pressed. The CPU 22 scrolls the displayed picture of the plan view 4 in the direction corresponding to the pressed one of the scroll buttons 55–58, and returns to the idling state 102.

When the probe 1 is pressed against a surface of the housing of a trap with the CPU 22 in the idling state 102, and a measurement starting switch (not shown) connected to the probe 1 is turned on, the CPU 22 executes an arithmetic operation processing 122 in response to the turning on of the measurement starting switch.

In the arithmetic operation processing 122, the CPU 22 determines the presence or absence of steam leakage and the amount of steam leaking, if any, based on the data representing the correlation between the vibration-representative signal representing the vibrations detected by the probe 1, and the amount of steam leakage. It is to be noted that the CPU 22 starts the arithmetic operation 122 via the window display ending processing 110 (i.e. after closing the window 7) when the probe 1 is urged against the trap housing with the window 7 being displayed.

After the CPU 22 determines the presence or absence of steam leakage and also the amount of steam leaking, the CPU 22 executes a trap data renewing processing 124, in which the data stored in the memory unit 23 is renewed. Specifically, the result of determination is written in the "Result" column for the pertinent trap shown in FIG. 3.

After renewing the data, the CPU 22 executes a display renewal processing 126, in which the CPU 22 changes the display state of the symbol 45 for the trap measured, based on the result of determination written into the "Result" column. After that, the CPU 22 executes a measurement data transmitting processing 128.

Figure 13:
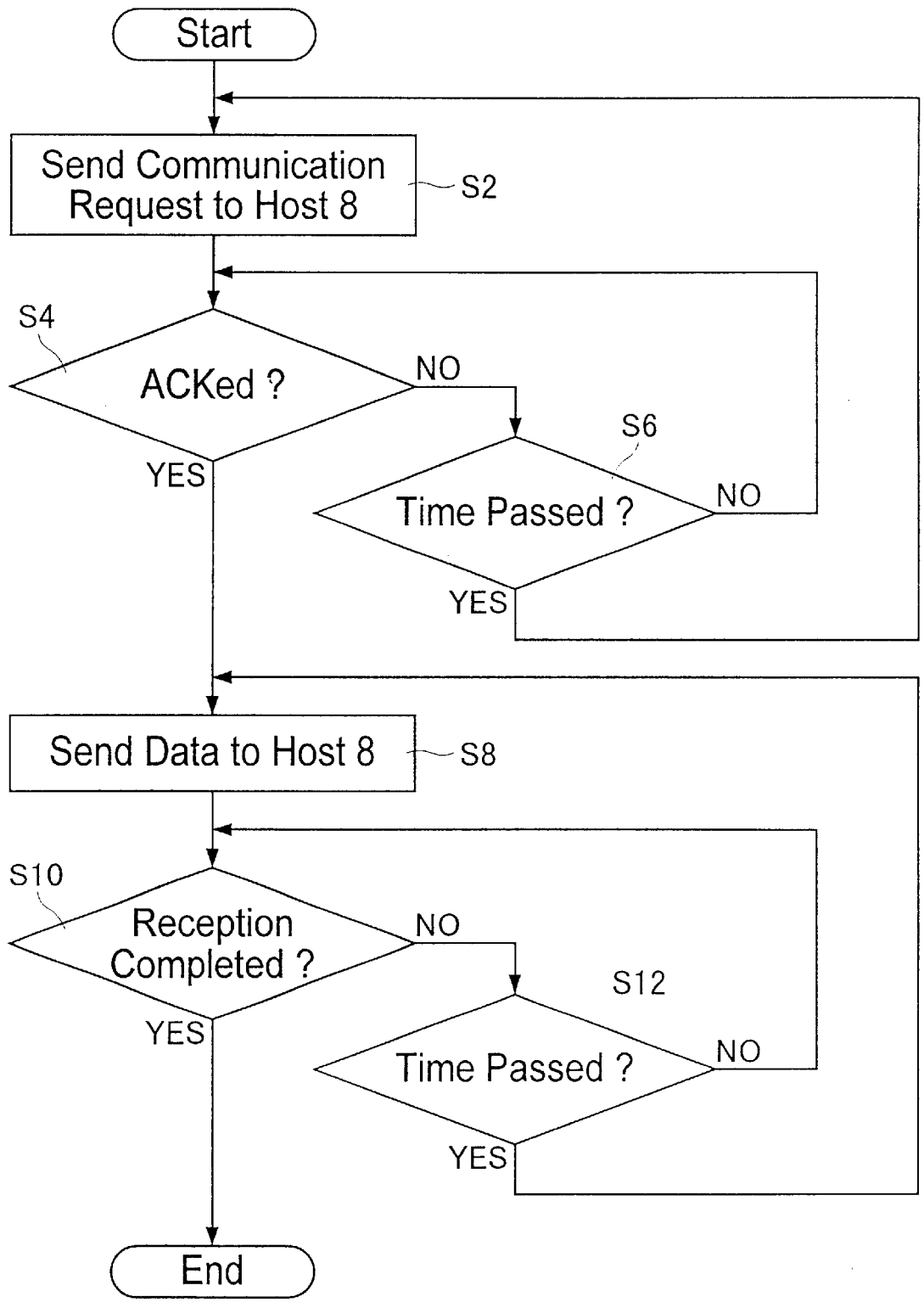
FIG. 13 is a flow chart for use in explaining in detail a part of the CPU operation shown in FIGS. 12A and 12B.

In the measurement data transmitting processing 128, the measuring apparatus with the CPU 22 being discussed acts as the measuring apparatus (m) discussed in FIG. 11. The detailed operation of the CPU 22 in the measurement data transmitting processing 128 is shown in FIG. 13.

First, the CPU 22 sends a communication request signal to the host computer 8 (Step S2), The CPU 22 awaits an ACK signal to be sent back within a predetermined time period from the host computer 8 (Steps S4 and S6). If the ACK signal is received within the predetermined time period, the CPU 22 sends the measurement data to the host computer 8 (Step S8). On the other hand, if no ACK signal is sent back from the host computer 8 within the predetermined time period after the transmittal of the communication request signal, i.e. if the answer to the question in Step S6 is YES, the CPU 22 returns to Step S2 and re-sends the communication request signal to the host computer 8.

After sending the measurement data to the host computer 8 in Step S8, the CPU 22 awaits a reception completion signal to be sent from the host computer 8 within a prescribed time period after the sending of the measurement data to the host computer 8 (Steps S10 and S12). When the CPU 22 receives the reception completion signal within the prescribed time period, i.e. when the answer to the query in Step S10 is YES, the CPU 122 ,ends its measurement data transmitting processing 128, and returns to the idling state 102.

On the other hand, if the reception completion signal is not sent back from the host computer 8 within the prescribed time period, i.e. if the answer to the query in Step S12 is YES, the CPU 22 returns to Step S8 and re-sends the measurement data to the host computer 8.

Returning to FIGS. 12A and 12B, receiving a communication request signal from the host computer 8, the CPU 22 in the idling state 102 starts executing a data receiving processing 130. (The execution by the CPU 22 of the data receiving processing 130 arrangement that another measuring apparatus has taken measurement with respect to a certain trap.) The operation in detail of the CPU 22 in the data receiving processing 130 is shown in FIG. 14.

Figure 14:
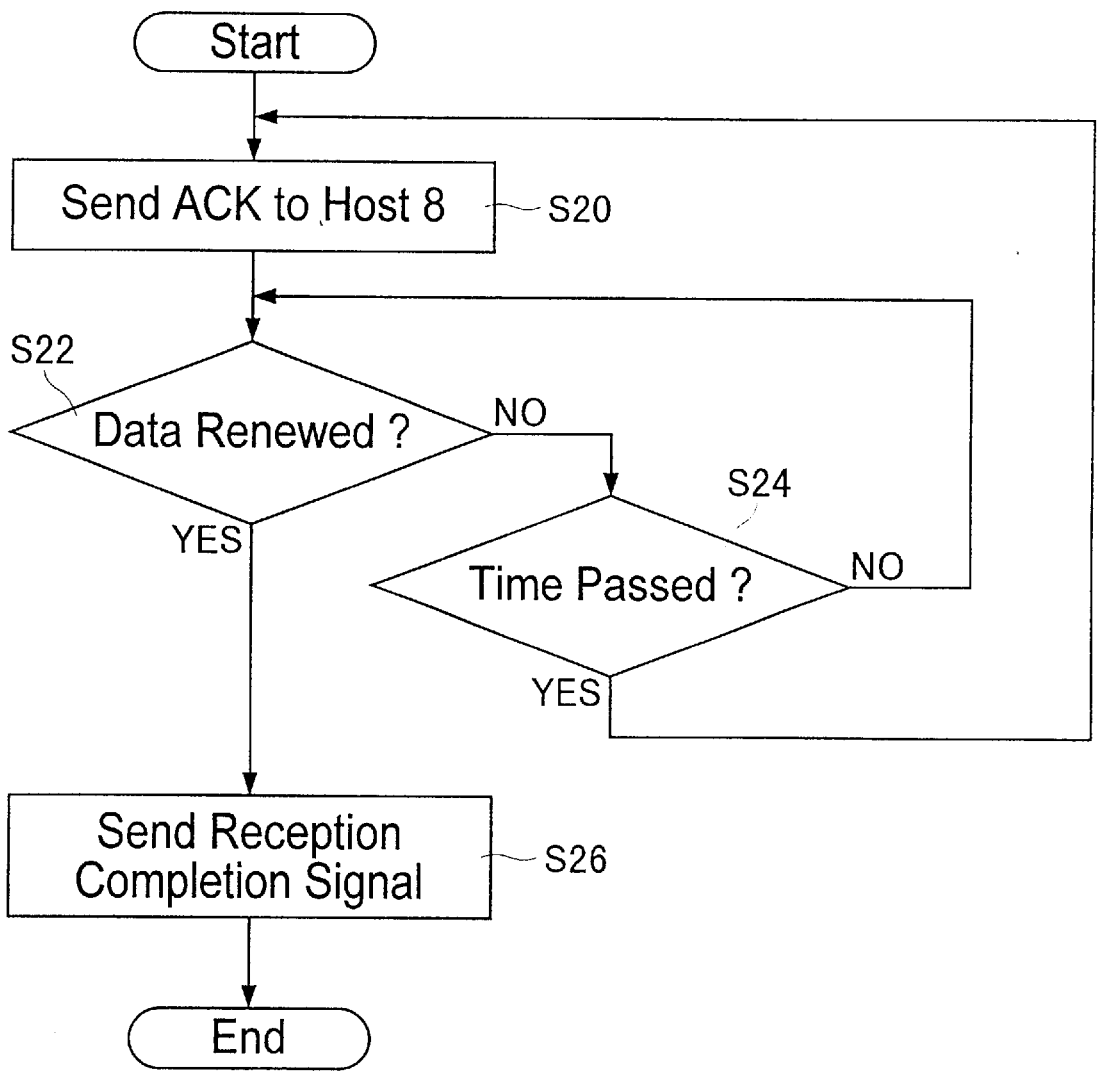
FIG. 14 is a flow chart for use in explaining in detail a part of the CPU operation different from the one shown in FIG. 13.

As shown in FIG. 14, on receiving the communication request signal, the CPU 22 sends an ACK signal to the host computer 8 (Step S20), and, after that, it awaits the above-described renewal data to be sent from the host computer 8 within a predetermined time period (Steps S22 and S24). When the CPU 22 has completed the reception of the renewal data, i.e. when the answer to the query in Step S22 is YES, the CPU 22 sends back a reception completion signal to the host computer 8 (Step S26). The CPU 22 finishes the data receiving processing 130 (FIG. 12B) and executes a trap data renewing processing 132 which is a processing similar to the trap data renewing processing 124.

On the other hand, if no renewal data is sent from the host computer 8 within the predetermined time period after sending the ACK signal to the host computer 8, i.e. if the answer to the query made in Step S24 is YES, the CPU 22 returns to Step S20 and re-sends the ACK signal to the host computer 8.

In the trap data renewing processing 132 (FIG. 12B) following the data receiving processing 130, the CPU 22 replaces the relevant data within the memory unit 23 by the renewal data received in the data receiving processing 130.

After renewing the trap data, the CPU 22 executes a display renewing processing 134, in which the display of the symbol 45 for the trap the data of which has been renewed is changed in accordance with the content written in the "Result" column. For example, if a particular trap is faulty, the symbol 45 corresponding to that trap is colored, and a marking "X" is added to the symbol 45, as described previously. After changing the display of the symbol 45, the CPU 102 returns to the idling state 102.

Figure 15A:
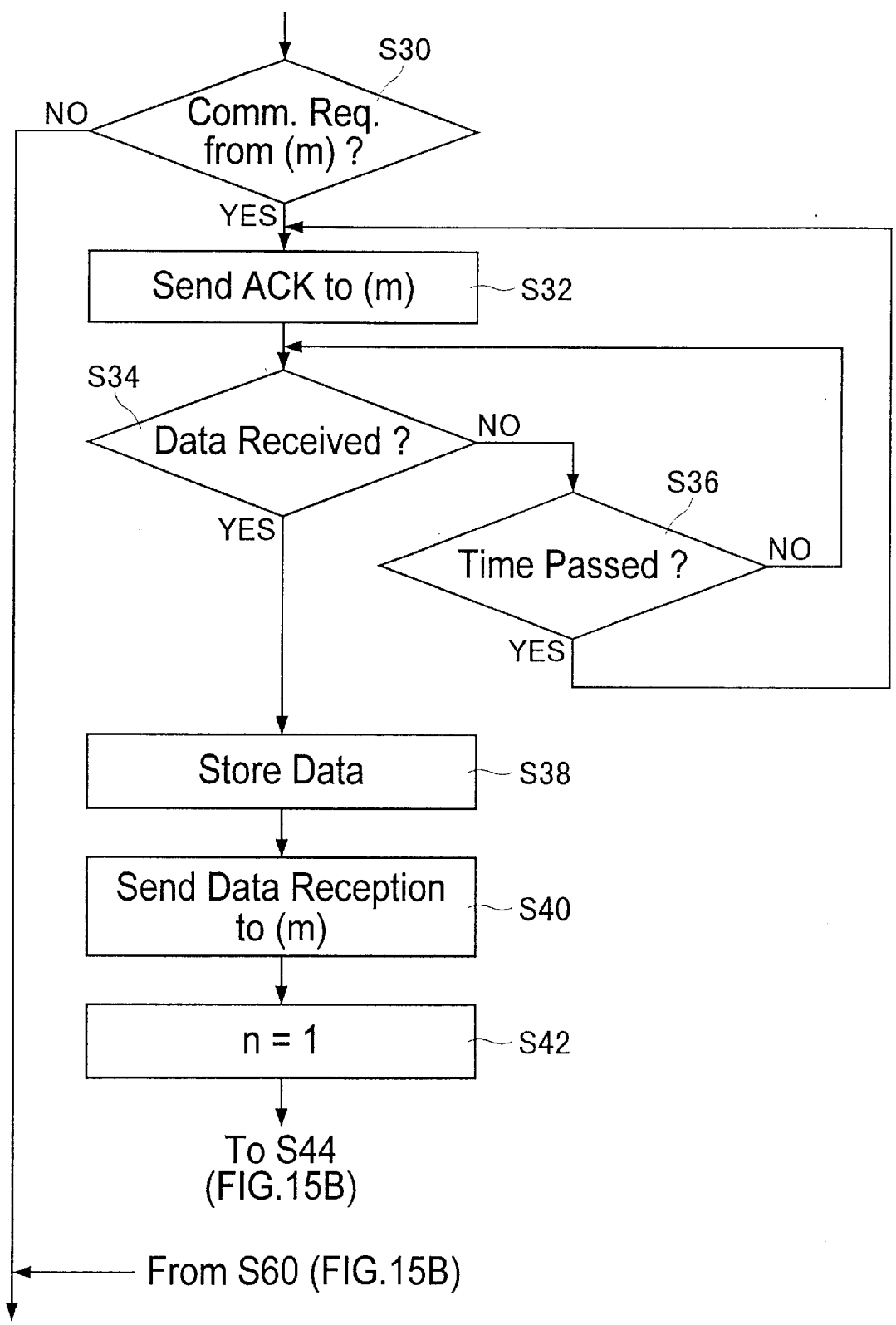
FIGS. 15A and 15B show together a flow chart of the operation of a CPU of the host computer.

The CPU 81 of the host computer 8 operates in a manner as illustrated by a flow chart shown in FIGS. 15A and 158, in order to achieve data communications with the respective ones of the measuring apparatuses. The control program for the CPU 81 has been stored in the memory unit 84 of the host computer 8.

When receiving a communication request signal from one measuring apparatus (m), the CPU 81 sends an ACK signal to that measuring apparatus (m) (Step S32), and awaits measurement data to be sent from the measuring apparatus (m) within a prescribed time period (Steps S34 and S36). If the measurement data is successfully received, i.e. if the answer to the query in Step S34 is YES, the CPU 81 stores the received measurement data in the memory unit 84 (Step S38), and sends a reception completion signal to the measuring apparatus (m) (Step S40). On the other hand, if no measurement data is received within the prescribed time period from the measuring apparatus (m), i.e. if the answer to the query made in Step S36 is YES, the CPU 81 returns to Step S32 and re-sends the ACK signal to the measuring apparatus (m).

After sending the reception completion signal, the CPU 81 sends the communication request signal to the smallest-numbered one (n) of the measuring apparatuses excluding the measuring apparatus (m) (Steps S42, S44 and S48), and awaits an ACK signal to be sent back from the measuring apparatus (n) within a prescribed time period (Steps S50 and S52). Receiving the ACK signal from the measuring apparatus (n), the CPU 81 calls the measurement data which has been stored in the memory unit 84 in Step S38, and sends the called-out measurement data to the measuring apparatus (n) as renewal data (Step S54).

After sending the renewal data, the CPU 81 awaits a reception completion signal to be sent within a prescribed time period from the measuring apparatus (n) (Steps S56 and S58). Receiving the reception completion signal, the CPU 81 advances to the next step S60. On the other hand, if the reception completion signal is not sent back from the measuring apparatus (n) within the prescribed time period, i.e. if the answer to the question made in Step S58 is YES, the CPU 81 returns to Step S54 and resends the renewal data to the measuring apparatus (n).

In Step S60, the CPU 81 sees whether or not the renewal data has been sent to all of the measuring apparatuses. If it is known that the renewal data has not yet been sent to all of the measuring apparatuses, the CPU 81 executes Step S46 and repeats the processing as executed in the steps of from Step S44 to Step S58, to send the renewal data to the next measuring apparatus (n+1). If the CPU 81 finds that the renewal data has been sent to all of the measuring apparatuses, it finishes the control.

The present invention has been described by way of a steam trap measuring apparatus and system, but it can be embodied in other fields.

The trap identification arrangement is not limited to an optical reading system using a bar code, but a wireless system, for example, may be employed in which trap identification data is stored in a chip with a semiconductor memory, and the data is wirelessly read out from the chip.

In the above-described example, information transfer between the probe 1 and the base unit 2 is done by an infrared communication technology, but it may be carried out by a radio communication technology. Alternatively, the probe 1 and the base unit 2 can be interconnected by a cable.

The data transfer between the measuring apparatus and the host computer 8 has been described to be done by way of the small-power wireless transceivers 3 and 9, but mobile communication techniques used in, for example, cellular systems and personal handyphone systems, may be used. Alternatively, the data transfer may be done by interconnecting the measuring apparatuses and the host computer by cables.

The CPU 22 of each measuring apparatus has been 20 described to operate in accordance with the transition diagram shown in FIGS. 12A and 12B, but it is only an example.

Figure 15B:
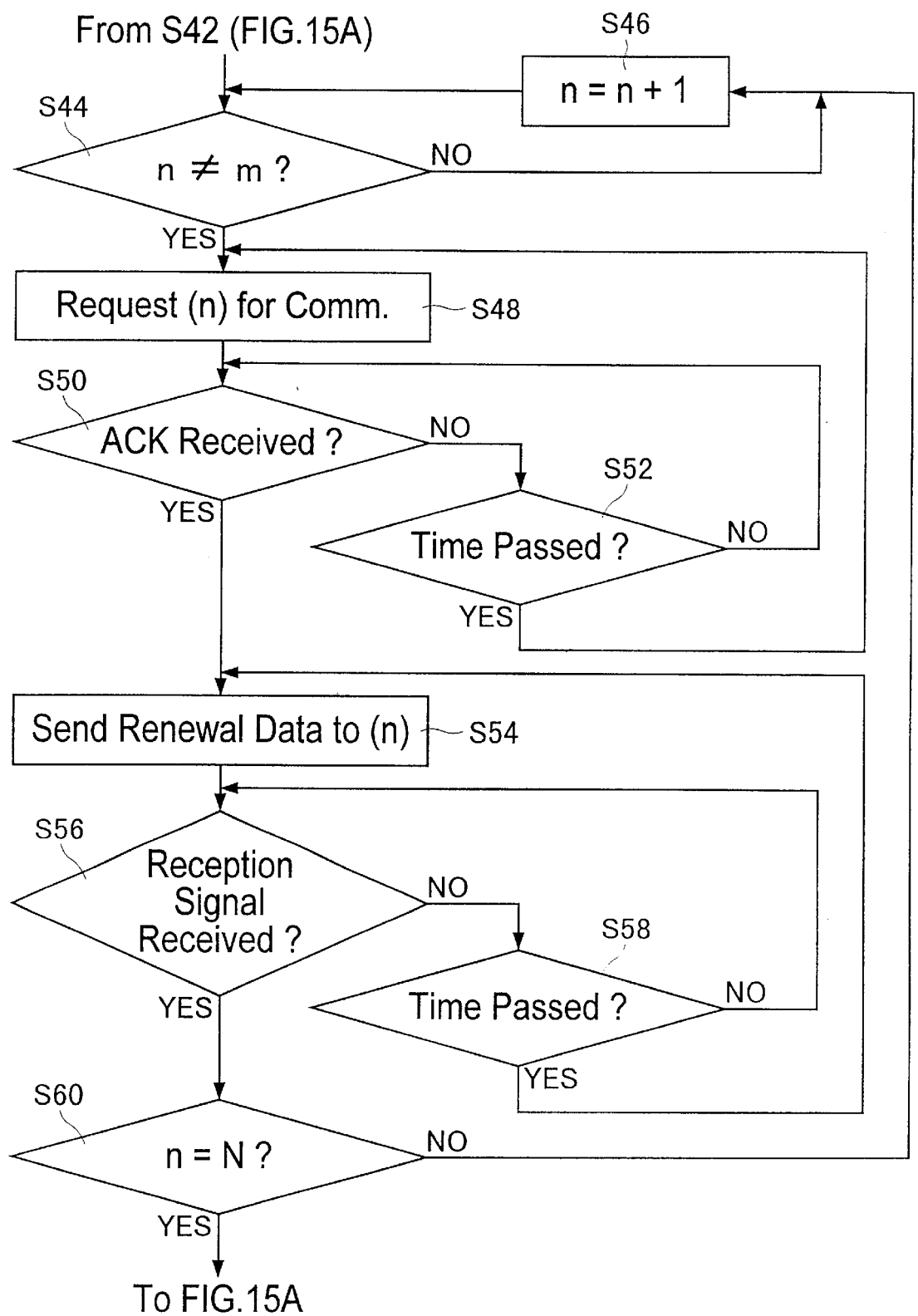

The operations of the CPUs 22 and 81 for data communications therebetween according to the protocol shown in FIG. 11 have been described with reference to FIGS. 13, 14 and 15, but they are only an example, and the CPUs 22 and 81 may be arranged to operate in a different way from the one represented in FIGS. 12–15.

Figure 16:
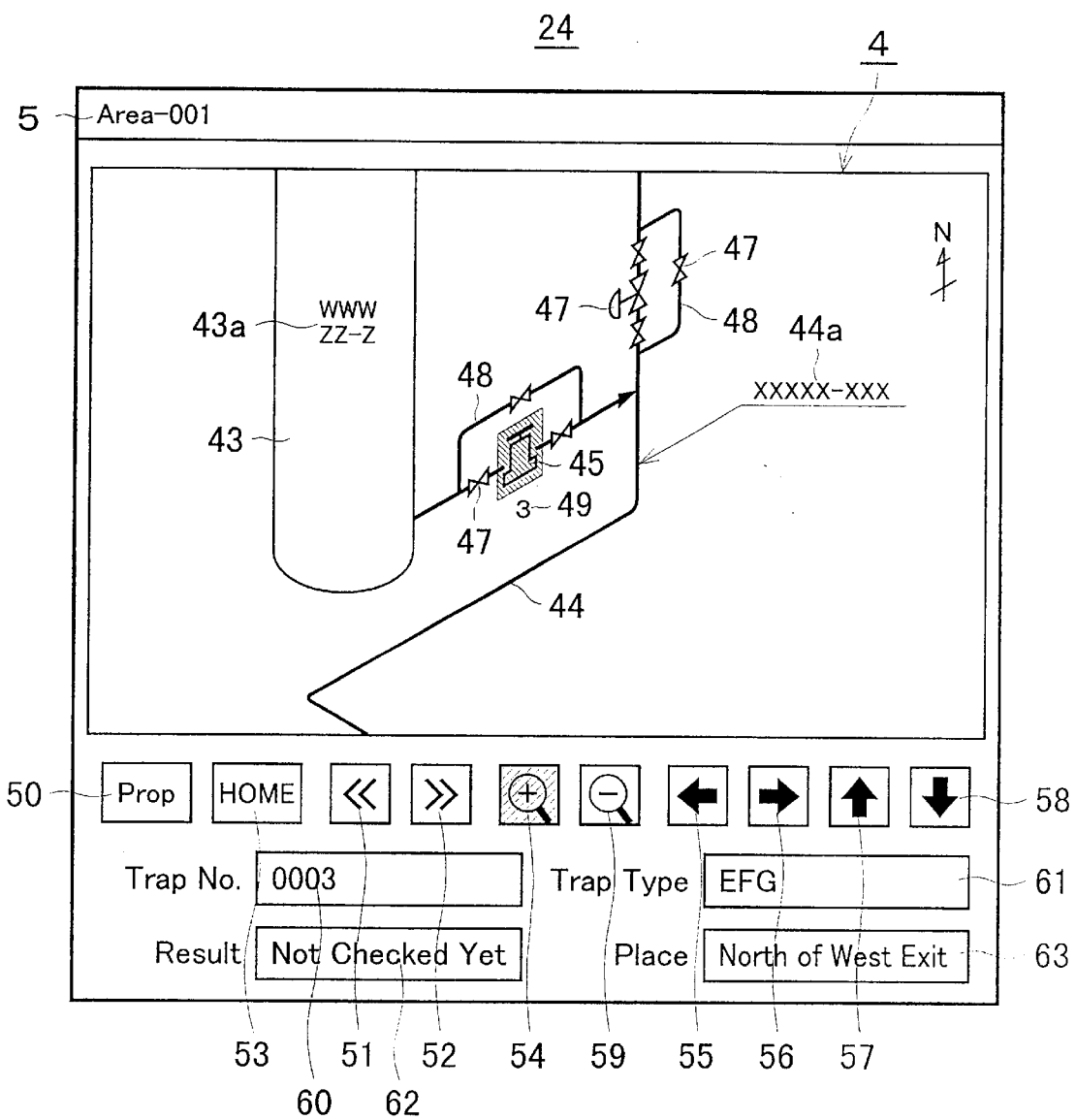
FIG. 16 is a picture displayed on the display screen different from the ones shown in FIGS. 4 through 9.

The picture of an area has been described as being two-dimensional, but it may be three-dimensional as shown in FIG. 16. FIG. 16 corresponds to FIG. 8 showing the plan view 4 on an enlarged scale.

What is claimed is:

1. A position finder, comprising:
   an identification data taking arrangement for taking identification data from each of a plurality of identification devices disposed at locations in a given area, the identification data being uniquely assigned to respective ones of the plurality of identification devices;
   a first memory for storing information including the identification data relating to the respective ones of the plurality of identification devices;
   a display including a display screen; and
   a first display control arrangement for causing an area picture of the given area to be displayed on the display screen and for causing a symbol for each of the plurality of identification devices to be displayed at a location on the area picture corresponding to the location in the given area where the respective one of the plurality of identification devices is disposed, wherein:
   the first display control arrangement, when the identification data of any one of the plurality of identification devices is taken by the identification data taking arrangement, causes the symbol corresponding to the taken identification data to be displayed in a different manner from other symbols.

2. The position finder according to claim 1, further comprising:
   a second display control arrangement responsive to an external information display command and for causing at least a part of the information stored in the first memory of the identification device associated with the identification data as taken by the identification data taking arrangement to be displayed on the display screen.

3. The position finder according to claim 1, wherein:
   the first display control arrangement is responsive to an external display scale change command for changing a scale on which the area picture is displayed on the display screen.

4. The position finder according to claim 1, wherein:
   the plurality of identification devices is disposed over a plurality of areas,
   a plurality of area pictures corresponds to respective ones of the plurality of areas, and
   the first display control arrangement, when the identification data of one of the plurality of identification devices is taken by the identification data taking arrangement, causes the area picture corresponding to the area where the one identification device is disposed to be displayed on the display screen.

5. A measuring apparatus, comprising:
   a measuring device for measuring a physical quantity of each of a plurality of objects disposed in a given area;
   an identification data taking arrangement for taking from each of a plurality of identification devices identification data uniquely assigned to respective ones of the plurality of objects, the plurality of identification devices bearing the identification data being disposed at a location that is one of on and near the respective ones of the plurality of objects;
   a first memory for storing information including the identification data of each of the plurality of objects;
   a display including a display screen; and
   a first display control arrangement for causing an area picture of the given area to be displayed on the display screen and for causing a symbol for each of the plurality of objects to be displayed at a location on the area picture corresponding to the location in the given area where that object is disposed, wherein:
   the first display control arrangement, when the identification data of any one of the plurality of objects borne by the one of the plurality of identification devices associated with that object is taken by the identification data taking arrangement, causes the symbol corresponding to that object to be displayed in a different manner from other symbols.

6. The measuring apparatus according to claim 5, wherein:
   the information of each of the plurality of objects stored in the first memory includes a parameter for measuring the physical quantity of that object, the measuring apparatus further comprising:
   a setting arrangement for, when the identification data taking arrangement takes the identification data of any one of the plurality of objects borne by the identification device associated with that object, calling the parameter for the object corresponding to the taken identification data from the first memory and for setting the parameter in the measuring device.

7. The measuring apparatus according to claim 5, further comprising:
   a first memory control arrangement for storing measurement data resulting from measuring the physical quantity of each of the plurality of objects with the measuring device, in the first memory; and
   a second display control arrangement for causing the symbol for the object of which the physical quantity has been already measured, to be displayed in a different manner from other symbols, in accordance with a content which has been stored in the first memory by the first memory control arrangement.

8. The measuring apparatus according to claim 5, further comprising:
   a first memory control arrangement for storing measurement data resulting from measuring the physical quantity of each of the plurality of objects with the measuring device, in the first memory; and
   a second display control arrangement for causing the symbol for the object which is operating normally to be displayed in a different manner from a symbol for a faulty object, in accordance with a content which has been stored in the first memory by the first memory control arrangement.

9. A measuring system, comprising:
   a measuring device for measuring a physical quantity of each of a plurality of objects disposed in a given area;
   an identification data taking arrangement for taking from each of a plurality of identification devices identification data uniquely assigned to respective ones of the plurality of objects, the plurality of identification devices bearing the identification data being disposed at a location that is one of on and near the respective ones of the plurality of objects;
   a first memory for storing information including the identification data of each of the plurality of objects;
   a display including a display screen;
   a first display control arrangement for causing an area picture of the given area to be displayed on the display screen and for causing a symbol for each of the plurality of objects to be displayed at a location on the area picture corresponding to the location in the given area where that object is disposed, wherein:
      the first display control arrangement, when the identification data of any one of the plurality of objects borne by the one of the plurality of identification devices associated with that object is taken by the identification data taking arrangement, causes the symbol corresponding to that object to be displayed in a different manner from other symbols;
   a first transmitter arrangement for transmitting measurement data obtained by measuring the physical quantity of each of the plurality of objects by the measuring device; and a host device including:
   a first receiver arrangement for receiving the measurement data transmitted from the first transmitter arrangement, wherein the host device includes:
   a second memory for storing information relating to each of the objects, and
   a first memory control arrangement for storing the measurement data received by the first receiver arrangement in the second memory.

10. A measuring system comprising:
   a plurality of measuring apparatuses, each of the measuring apparatuses including:
      a measuring device for measuring a physical quantity of each of a plurality of objects disposed in a given area,
      an identification data taking arrangement for taking from each of a plurality of identification devices identification data uniquely assigned to respective ones of the plurality of objects, the plurality of identification devices bearing the identification data being disposed at a location that is one of on and near the respective ones of the plurality of objects,
      a first memory for storing information including the identification data of each of the plurality of objects,
      a display including a display screen,
      a first display control arrangement for causing an area picture of the given area to be displayed on the display screen and for causing a symbol for each of the plurality of objects to be displayed at a location on the area picture corresponding to the location in the given area where that object is disposed, wherein:
         the first display control arrangement, when the identification data of any one of the plurality of objects borne by the one of the plurality of identification devices associated with that object is taken by the identification data taking arrangement, causes the symbol corresponding to that object to be displayed in a different manner from other symbols;
      a first memory control arrangement for storing measurement data resulting from measuring the physical quantity of each of the plurality of objects with the measuring device, in the first memory, and
      a second display control arrangement for causing the symbol for the object of which the physical quantity has been already measured, to be displayed in a different manner from other symbols, in accordance with a content which has been stored in the first memory by the first memory control arrangement;
      a first transmitter arrangement for transmitting measurement data obtained by measuring the physical quantity of each of the plurality of objects by at least one of the measuring apparatuses;
      a first receiver arrangement for receiving renewal data externally applied thereto, the first memory control arrangement being so arranged as to store the renewal data as received by the second receiver arrangement in the first memory; and
   a host device including:
      a second receiver arrangement for receiving the measurement data transmitted from each one of the plurality of measuring apparatuses, and
      a second transmitter arrangement for transmitting the measurement data as received by the first receiver arrangement to the plurality of measuring apparatuses as the renewal data.

* * * * *